United States Patent Office 3,057,812
Patented Oct. 9, 1962

3,057,812
COATING COMPOSITIONS COMPRISING A RESINOUS COPOLYMER HAVING A REDUCED VISCOSITY OF 0.2 to 0.8 AND A SECOND ORDER TRANSITION TEMPERATURE OF 45° C. TO 125° C.
John R. Straughan, Montgomery, Ralph Stickle, Jr., St. Albans, and William F. Hill, Jr., South Charleston, W. Va., assignors to Union Carbide Corporation, a corporation of New York
No Drawing. Filed July 15, 1958, Ser. No. 748,594
39 Claims. (Cl. 260—29.6)

This invention relates to coating compositions and to processes for their preparation. In a particular aspect, this invention relates to vinyl interpolymer latices and their preparation and to improved surface coatings produced therefrom.

The understanding of this invention will be facilitated by reference to the following definition of terms.

By the term "reduced viscosity" as used herein is meant the expression:

$$I_r = \frac{T - T_0}{(T_0)(C)}$$

wherein T is the time required for a low concentrate polymer solution to pass through a standardized Ubbelohde viscometer; wherein $T_0$ is the time for the pure solvent to pass through the viscometer; and wherein C is the concentration of the solution. The concentration of the solution is 0.2 gram in 100 milliliters of cyclohexanone, and the measurement is conducted at 25° C., unless otherwise specified.

The term "second order transition temperature $(T_G)$" as used herein refers to the inflection temperature which is found by plotting the modulus of rigidity against temperature. A convenient method for determining modulus of rigidity and transition temperature is described by I. Williamson, British Plastics, 23, 87–90, 102 (September 1950).

The term "free carboxylic acid" group as used herein refers to the structure (—COOH) contained in the interpolymer which is reactive as an acid.

The term "polyepoxide" compound as used herein refers to an organic compound having at least two oxirane groups, i.e.,

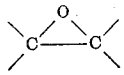

The term "polyhydric alcohols and phenols" refers to alcohol and phenol compounds containing at least two hydroxyl (—OH) groups.

The term "polyamine" refers to amine compounds containing at least two amino groups which have at least one amino hydrogen atom.

The term "filming aid" as used herein refers to an organic material which is unreactive with the components of a latex composition and which volatilizes more slowly than water from an applied latex coating. The boiling point of the filming aid material usually is in the range between about 100° C. and 300° C. When it is desirable to have filming aid material remain permanently in the final coating film, a plasticizer component is included in the filming aid which has a relatively high boiling point, e.g., in the range between about 200° C. and 400° C. The filming aid material has the ability to reduce the melt viscosity, lower the second order transition temperature and lower the elastic modulus of a latex composition interpolymer.

The term "melt viscosity" as used herein refers to the resistance to flow offered by a resinous material above its melting range.

The term "elastic modulus" as used herein refers to the force required to deform a fused resinuous material a unit length or amount.

Solution coating compositions have several serious disadvantages when applied from volatile organic solvents. A volatile organic solvent vehicle is costly and oftentimes hazardous. Moreover, the viscosity of the solution coating compositions varies with the amount of and kind of dissolved filming material. The molecular weight of the filming material in solution and the total solids content of the solution composition are limited by the solvating power of the particular solvent vehicle.

Aqueous coating compositions containing dispersed particles of polymeric filming material avoid the disadvantages attendant with a solvent vehicle and permit the use of higher molecular weight polymeric filming material and higher solids content than is possible with organic solution coating compositions. However, latex coating compositions are inferior to organic solution coating compositons in several important respects so that their application has been mainly restricted to "water-based" paints for interior use. The latex coating compositions are unsatisfactory in applications where the coatings are subjected to extreme conditions of moisture, sunlight, temperature variations, solvents, abrasion and the like. Also, the coatings sometimes tend to bubble and "crater" on application so that it is not possible to produce continuous, uniform films consistently. Further, since film formation in dispersion coatings depends on particle coalescence, and since particle coalescence depends on resin softness and flow, hard films are not produced. For these reasons, and partly due to poor pigment dispersing capacity, coatings deposited from aqueous polymer dispersions do not have high gloss, such as would be required for the painting of automobiles and appliances. High gloss is one of the important properties required of a coating in most protective film applications.

Accordingly, one or more of the following objects will be achieved by the practice of this invention.

It is an object of this invention to provide vinyl interpolymers containing free carboxylic acid groups and having a reduced viscosity of between about 0.2 and 0.8 and a second order transition temperature of between 45° C. and 125° C. which are capable of forming a hard, glossy film on a substrate at a temperature between about 0° C. and 300° C., and it is a further object to provide a method for their preparation.

It is another object of this invention to provide alkaline latex dispersions of vinyl interpolymers containing free carboxylic acid groups and having a reduced viscosity of between about 0.2 and 0.8 and a second order transition temperature of between about 45° C. and 125° C.

It is another object of this invention to provide alkaline latex vinyl interpolymer compositions containing a quantity of filming aid and a quantity of a reactive compound capable of cross-linking free carboxylic acid groups bound in the dispersed interpolymer.

It is another object of this invention to provide aqueous dispersions of vinyl resins which have good pigment binding and dispersive capacity and form continuous, uniform coatings when applied to a surface.

It is a further object of this invention to provide latex vinyl interpolymer compositions which are useful for preparing surface coatings that are durable under outdoor exposure conditions and are solvent resistant.

It is a particular object of this invention to provide latex coating compositions adapted to form hard, glossy, continuous films on substrates with properties that qualify the latex compositions for protective coating application in the automotive and appliance industries.

Various other objects and advantages of the present invention will become apparent to those skilled in the art from the accompanying description and disclosure.

One or more objects of this invention are accomplished by interpolymerizing, in an aqueous emulsion system hereinafter more fully described, an α,β-olefinically unsaturated carboxylic acid having up to ten carbon atoms in specific proportions with a mixture of monomers containing at least one hardening component and at least one flexibilizing component hereinafter more fully described, to produce an interpolymer having a reduced viscosity of between about 0.2 and 0.8 and a second order transition temperature of between about 45° C. and 125° C.

The coating compositions of this invention particularly adapted for protective coating application are latex compositions which comprise an aqueous dispersion of an interpolymer comprising (1) about 25–90 parts by weight selected from the group consisting of monovinyl aromatic hydrocarbon, methyl methacrylate, vinyl acetate, vinyl fluoride, vinyl chloride, vinylidene fluoride and vinylidene chloride, (2) 0–50 parts by weight of α,β-olefinically unsaturated nitrile, (3) about 10–60 parts by weight selected from the group consisting of alkyl acrylate having between four and about fifteen carbon atoms, alkyl methacrylate having between five and about fifteen carbon atoms, cyanoalkyl acrylate, acrylamide and N,N-dialkylacrylamide, and (4) about 1–10 parts by weight of α,β-olefinically unsaturated carboxylic acid containing up to about ten carbon atoms, said interpolymer having a reduced viscosity of between about 0.2 and 0.8 and a second order transition temperature of between about 45° C. and 125° C. and said latex compositions having a pH in the alkaline range.

The monovinyl aromatic hydrocarbons contemplated are exemplified by compounds such as styrene, p-methylstyrene, alpha-methylstyrene, m-ethylstyrene, p-fluorostyrene, o-chlorostyrene, 2,6-dichlorostyrene, m-trifluoromethylstyrene, o-cyanostyrene, m-nitrostyrene, p-nitrostyrene, vinyl naphthalene, and the like.

Monovinyl aromatic hydrocarbons, vinyl acetate, vinyl fluoride, vinyl chloride, vinylidene fluoride and vinylidene chloride are preferably employed in a quantity between about 25 and 60 parts by weight, and methyl methacrylate is preferably employed in a quantity between about 50 and 85 parts by weight. The members of this group have been observed to impart hardness to interpolymers in which they are contained.

The α,β-olefinically unsaturated nitriles contemplated are exemplified by compounds such as acrylonitrile, methacrylonitrile, α-chloroacrylonitrile, α-trifluoromethylacrylonitrile, and the like. The α,β-olefinically unsaturated nitriles are preferably employed in an amount between about 5 and 30 parts by weight.

The alkyl acrylates having between four and about fifteen carbon atoms contemplated are exemplified by compounds such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, n-octyl acrylate, n-decyl acrylate, and the like.

The alkyl methacrylates having between five and about fifteen carbon atoms contemplated are exemplified by compounds such as ethyl methacrylate, n-butyl methacrylate, isobutyl methacrylate, n-amyl methacrylate, 2-ethylhexyl methacrylate, n-octyl methacrylate, n-decyl methacrylate, and the like.

The cyanoalkyl acrylates contemplated are exemplified by compounds such as cyanoethyl acrylate, cyanobutyl acrylate, and the like.

The N,N-dialkylacrylamides contemplated are exemplified by compounds such as N,N-dimethylacrylamide, N,N-diethylacrylamide, N,N-dibutylacrylamide, and the like. The alkyl groups can contain between one and about five carbon atoms. The acrylamides are preferably employed in an amount between about 10 and 25 parts by weight, although as little as 5 parts by weight of acrylamides can be employed in some interpolymer compositions.

The alkyl acrylate, alkyl methacrylate, cyanoalkyl acrylate and acrylamide monomers defined above have been observed to impart flexibility to interpolymers in which they are contained.

The α,β-olefinically unsaturated carboxylic acids contemplated are exemplified by compounds such as acrylic acid, methacrylic acid, crotonic acid, cinnamic acid, atropic acid, α-chloroacrylic acid, α-fluoroacrylic acid, maleic acid, fumaric acid, itaconic acid, mono-isopropyl maleate, mono-n-butyl fumarate, and the like. The carboxylic acids are preferably employed in an amount between about 2 and 7 parts by weight.

The preferred coating compositions of this invention for forming continuous, hard, glossy, protective films on substrates at a temperature between about 0° C. and 300° C. are alkaline latex dispersions of the above-defined interpolymers which contain between about 15 and 50 weight percent of filming aid based on the weight of interpolymers, and a quantity of a reactive organic compound, hereinafter defined, capable of cross-linking said interpolymers.

The alkaline latex coating compositions of this invention are superior to the other latex coating compositions of the art for forming continuous, glossy, surface coatings. The preferred coating compositions of this invention containing a cross-linking agent have further advantages over prior art latex compositions in that they form coatings which have exceptional hardness and toughness, good resistance to solvents and outstanding inertness to moisture and sunlight. The cross-linking agent employed is a compound capable of interacting with free carboxylic acid groups during film formation, such as polyepoxides, polyhydric alcohols and phenols, polyamines, and other such polyfunctional compounds. Polyepoxides are especially useful because they cross-link rapidly and efficiently over a broad temperature range and they do not cause formation of troublesome, volatile condensation by-products. Particularly outstanding polyepoxide cross-linking agents include polyepoxide derivatives containing two or more cyclopentene oxide groups such as bis(2,3-epoxycyclopentyl)ether, and polyepoxide derivatives containing two or more cyclohexene oxide groups such as aliphatic polyol epoxycyclohexanecarboxylates exemplified by compounds which include 3-methyl-1,5-pentanediol bis(3,4-epoxycyclohexanecarboxylate),1,5 - pentanediol bis(3,4-epoxycyclohexanecarboxylate), 2-methoxymethyl-2,4-dimethyl - 1,5 - pentanediol bis(3,4 - epoxycyclohexanecarboxylate), ethylene glycol bis(3,4-epoxycyclohexanecarboxylate), 2,2-diethyl-1,3-propanediol bis(3,4-epoxycyclohexanecarboxylate), 1,6 - hexanediol bis(3,4-epoxycyclohexanecarboxylate), 2-butene-1,4-diol bis (3,4-epoxycyclohexanecarboxylate), 2 - butene-1,4-diol bis(3,4-epoxy-6-methylcyclohexanecarboxylate), 1,1,1-trimethylolpropane tris(3,4-epoxycyclohexanecarboxylate), 1,2,3-propanetriol tris(3,4 - epoxycyclohexanecarboxylate); oxyalkylene glycol epoxycyclohexanecarboxylates exemplified by compounds which include dipropylene glycol bis(2-ethylhexyl 4,5-epoxycyclohexane-1,2-dicarboxylate), diethylene glycol bis(3,4-epoxy-6-methylcyclohexanecarboxylate), triethylene glycol bis(3,4-epoxycyclohexanecarboxylate); epoxycyclohexylalkyl epoxycyclohexanecarboxylates exemplified by compounds which include 3,4-epoxycyclohexylmethyl 3,4-epoxycyclohexanecarboxylate, 3,4-epoxy-1 - methylcyclohexylmethyl 3,4-epoxy-1-methylcyclohexanecarboxylate, 3,4-epoxy-2-methylcyclohexylmethyl 3,4-epoxy-2-methylcyclohexanecarboxylate, (1-chloro-3,4-epoxycyclohexan-1-yl)methyl 1,-chloro-3,4-epoxycyclohexanecarboxylate, (1 - bromo - 3,4 - epoxycyclohexan-1-yl)-methyl 1 - bromo - 3,4-epoxycyclohexanecarboxylate, (1-chloro-2-methyl-4,5-epoxycyclohexan-1-yl)methyl 1-chloro - 2 - methyl - 4,5-epoxycyclohexanecarboxylate; epoxycyclohexylalkyl dicarboxylates exemplified by compounds which include bis(3,4-epoxycyclohexylmethyl) pimelate, bis(3,4-epoxy-6-methylcyclohexylmethyl) maleate, bis(3,4-epoxy-6-methylcyclohexylmethyl) succinate, bis(3,4-epoxycyclohexylmethyl) oxalate, bis(3,4-epoxy-6-methylcyclohexylmethyl) sebacate, bis(3,4-epoxy-6-methylcyclohexylmethyl), adipate; epoxycyclohexylalkyl phenylenedicarboxylates exemplified by compounds which include bis(3,4-epoxycyclohexylmethyl) terephthalate, bis(3,4-epoxy-6-methylcyclohexylmethyl) terephthalate; epoxycyclohexylalkyl oxyalkylene glycol ethers exemplified by compounds which include bis(3,4-epoxy-6-methylcyclohexylmethyl) diethylene glycol ether; sulfonyldialkanol bis(epoxycyclohexanecarboxylates) exemplified by compounds which include 2,2'-sulfonyldiethanol bis(3,4-epoxycyclohexanecarboxylate); epoxycyclohexane-1,2-dicarboximides exemplified by compounds which include N,N'-ethylene bis(4,5-epoxycyclohexane-1,2-dicarboximide); epoxycyclohexylalkyl carbamates exemplified by compounds which include di(3,4-epoxycyclohexylmethyl) 1,3-tolylenedicarbamate; epoxycyclohexyalkyl acetals exemplified by compounds which include bis(3,4-epoxy-6-methylcyclohexylmethyl) 3,4-epoxy-6-methylcyclohexanecarboxaldehyde acetal; and epoxycyclohexyl-substituted spirobi(metadioxane) derivatives exemplified by compounds which include 3,9-bis(3,4-poxycyclohexyl)-spirobi(meta-dioxane). Other polyepoxide derivatives may be employed, such as vinyl cyclohexene dioxide, 3,4-epoxy-6-methylcyclohexylmethyl 9,10-epoxystearate, 1,2-bis(2,3-epoxy-2-methylpropoxy)ethane, the diglycidyl ether of 2,2-(p-hydroxylphenyl)propane, and the like, when the efficiency and rate of cross-linking is not critical. It has also been observed that employing mono-epoxide derivatives, such as mono(methylglycidyl) ethylene glycol, provides useful coating compositions which can be cast as continuous, glossy films; however, these films are not resistant to solvents and moisture as are the films cross-linked with polyfunctional organic agents.

The polyhydric alcohol cross-linking agents which may be employed include aliphatic polyols such as diethylene glycol, 1,5-pentanediol, 2,-butyne-1,4-diol, trimethylolmethane, pentaerythritol, diglycerol, polyvinylalcohol, and the like; the polyhydric phenol cross-linking agents which may be employed include resorcinol, trimethylolphenol, bis(4-hydroxyphenyl)methane, polyhydric phenolic-formaldehyde condensation products, and the like.

The polyamine cross-linking agents which may be employed include aliphatic polyamines such as ethylenediamine, propylenediamines, pentylenediamines, 1,3-diamino-2-propanol, 3,3'-iminobispropylamine, diethylenetriamine, and the like, and polyamines such as guanidine, dimethylurea, and the like; and aromatic polyamine derivatives such as phenylenediamines, naphthalenediamines, toluenediamines, biphenyldiamines, and the like.

The polyfunctional cross-linking agent is employed in a cross-linking amount, i.e., an amount which is at least sufficient to react with the free carboxyl groups of the interpolymer. Various factors determine the amount of cross-linking agent employed, such as the functionality of the cross-linking agent, the quantity of interpolymer being cross-linked, the number of free carboxyl groups in said interpolymer, and the degree of cross-linking desired. For maximum cross-linking, the amount of polyfunctional cross-linking agent employed must be sufficient to provide at least one reactive group capable of reacting with each free carboxylic acid group contained in the polymer. For example, for maximum cross-linking employing a polyepoxide, at least one epoxide group should be provided for every available carboxylic acid group present in the latex interpolymer. Generally, the polyfunctional cross-linking agent is used in a quantity that provides between about 0.5 and 2.0 reactive groups for each available interpolymer carboxylic acid group in the coating composition, the preferred range being between about 1.0 and 1.5 reactive groups per acid group. The reactive groups are preferably epoxide groups, hydroxyl groups, and/or amino groups containing at least one amino hydrogen.

Cross-linking agents such as bis(2,3-epoxycyclopentyl)-ether, epoxide derivatives containing two or more cyclohexene oxide groups, and other polyepoxide derivatives that are highly reactive with free carboxylic acid groups, are particularly preferred with the coating compositions of this invention. These highly reactive cross-linking agents can provide a greater degree of cross-linking or provide complete cross-linking in a coating formed at room temperature or temperatures close to room temperature where the less reactive cross-linking agents provide little or no cross-linking activity. In baked coating applications, the highly reactive cross-linking agents cross-link the interpolymer rapidly and efficiently when present in a smaller quantity than would be required for a comparable effect with a less reactive cross-linking agent.

The latex coating compositions containing a cross-linking agent are adapted to form protective films at temperatures between about 0° C. and 300° C. which are continuous, hard, glossy and resistant to solvents and the deleterious effects of outdoor exposure. When the latex coating compositions containing a cross-linking agent are applied to metallic or non-metallic substrates, they vary as to the temperature and period of time required for formation of a film which is continuous and has the maximum degree of cross-linking and the full advantage of desirable properties for a particular coating composition. This variation is partly determined by the ability of the interpolymer particles dispersed in the latex to flow and coalesce with each other and to wet pigment particles and the like, and it is partly determined by the reactive ability of the cross-linking agent contained in the latex composition to cross-link the interpolymer through the available carboxylic acid groups in the molecules.

Interpolymers which have a reduced viscosity value less than about 0.2 tend to form weak, brittle coatings, and interpolymers which have a second order transition temperature value lower than about 45° C. tend to form coatings which are too soft; interpolymers which have a reduced viscosity greater than about 0.8, and/or a second order transition temperature higher than about 125° C., do not flow and coalesce well under ordinary coating conditions and there is difficulty producing glossy coatings.

The interpolymers having a reduced viscosity of between about 0.2 and 0.8 and a second order transition temperature of between about 45° C. and 125° C., can form a continuous film on surfaces with filming aid when dried at room temperature or temperatures close to room temperature, e.g., at temperatures between about 0° C. and 50° C. To speed the rate of coalescence of a particular latex interpolymer on a substrate, at a given temperature, it is only necessary to increase the amount of filming aid material in the coating composition. In films that have coalesced satisfactorily at room temperature or other relatively low temperatures, the degree of cross-linking interaction between a cross-linking agent and the carboxylic acid groups of the polymer will depend on the reactivity of the cross-linking agent. As mentioned previously, compounds containing two or more cyclopentene oxide groups, such as bis(2,3-epoxycyclopentyl) ether,

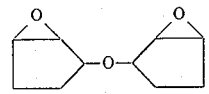

and compounds containing two or more cyclohexene oxide groups, such as 3,4-epoxy-6-methylcyclohexylmethyl 3,4-epoxy-6-methylcyclohexanecarboxylate,

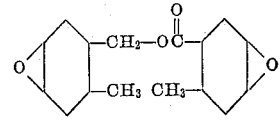

are particularly preferred highly reactive epoxide derivatives which can give a satisfactory degree of cross-linking in the interpolymer at temperatures of about 50° C. or below, in a period from about five hours to two weeks, i.e., the coating containing the interpolymer will have moisture resistance and solvent resistance sufficient for protective coating applications.

The latex coating compositions of this invention which are coalesced and dried at room temperature, or at moderate temperatures up to about 50° C., form films which are continuous and glossy. The ability of a coating formed at these lower temperatures to withstand deleterious outdoor exposure, abrasion and contact with solvents, will directly depend on the amount of cross-linking produced between the polymer molecules. The amount of protection these coatings afford a substrate increases as the degree of cross-linking in the coating interpolymer increases. Film formation at temperatures higher than room temperature is advantageous in that much less filming aid usually is needed for polymer coalescence, and the desired degree of cross-linking is accomplished quickly and efficiently. Filming aid material can be reduced to a minute quantity in a latex coating composition, or it can be dispensed with entirely, if the coating composition is applied to a substrate at a temperature which is higher than the second order transition temperature of the interpolymer contained in the coating composition. For practical purposes, the use of a latex composition which is to be applied at a temperature higher than the second order transition temperature of the interpolymer in the composition without filming aid is essentially limited to those compositions which contain an interpolymer with a relatively low second order transition temperature, e.g., in the range between about 45° C. and 100° C.

In a preferred embodiment of this invention which is particularly adapted for application in the automotive and appliance industries, a latex composition is applied to a surface as one or more coatings and air-dried or baked after each application. If the successive coatings are only air-dried as they are deposited on the surface, then the final coating is subjected to a baking period at a temperature between about 100° C. and 300° C., with the preferred baking temperature range being between about 140° C. and 180° C. The latex coating compositions can serve both as primer and topcoat on a substrate. A latex primer coating can be identical in composition to a topcoat latex composition or it can be different, e.g., composition components such as pigments and filming aids can be varied to suit the purpose that a particular composition is to serve. A latex coating composition can be used as a primer or topcoat in combination with coatings other than those from the compositions of this invention. For example, in the automotive industry a latex composition can be applied as a primer coating and a conventional alkyd melamine or acrylic lacquer can be applied over it. Conversely, the latex compositions can perform as excellent topcoats over standard primers.

The compositions of this invention, or intermediate forms of the compositions, are prepared by interpolymerizing the desired mixture of monomers in an aqueous emulsion system under conditions hereinafter specified to produce an interpolymer having a reduced viscosity of between 0.2 and 0.8 and a second order transition temperature of between 45° C. and 125° C. The preferred method of controlling the reduced viscosity of an interpolymer being produced is to include a telogen molecular weight modifier, i.e., a polymer chain terminator, in the emulsion polymerization system. The molecular weight of the interpolymer is prevented from exceeding the molecular weight range of a given interpolymer which exhibits the proper reduced viscosity. Alkyl mercaptans, such as dodecyl mercaptan, tertiary butyl mercaptan and the like, are satisfactory telogen molecular weight modifiers. Other well-known telogen molecular weight modifiers can be employed such as ortho-mercaptobenzoic acid, acetaldehyde, paraldehyde and carbon tetrachloride. The amount of telogen molecular weight modifier incorporated in a polymerization recipe can vary between about 0.1 and 2.0 weight per cent, based on the weight of total monomer charge, with between about 0.25 and 0.5 weight percent being the preferred range. Besides controlling the molecular weight of an interpolymer in an aqueous polymerization system, telogens such as alkyl mercaptans appear to minimize clogging of spray gun tips when a latex paint formulation containing a telogen is being applied by spraying, and they also tend to reduce corrosion of metal substrates.

The polymerization can be conducted at a temperature in the range from about 0° C. to 100° C., with an intermediate range such as 60° C. to 90° C. being preferred. The polymerization temperature depends in part on the particular catalyst system being employed. A catalyst is employed which generates free radicals in the presence of water, such as peroxide and persulfate catalysts. Excellent results are obtained with water soluble peroxides and persulfates such as hydrogen peroxide with a sodium bisulfite initiator (redox system), or potassium persulfate. Monomer soluble catalysts such as benzoyl peroxide are also applicable for preparing the latices but high conversions are not always realized with this type of catalyst under the preferred polymerization conditions contemplated in this invention. Still other conventional catalysts may be used, such as salts of inorganic peroxides and azo nitrile compounds. The quantity of catalyst included in the aqueous emulsion polymerization recipes varies over a wide range, but in most cases a catalyst concentration of between 0.1 and 3.0 weight percent based on the weight of total monomer charge is satisfactory, with 0.25 to 0.75 weight percent of catalyst being the preferred range. A catalyst such as potassium persulfate propagates the aqueous emulsion polymerization of an interpolymer efficiently and rapidly at a temperature between about 75° C. and 80° C. when present in the reactor system at a concentration of about 0.5 weight percent based on the monomer charge. Generally, as the initial concentration of a catalyst employed decreases below about 0.5 weight percent, the reaction rate of polymer product decreases and the molecular weight increases somewhat. Conversely, as the initial concentration of catalyst employed increases, the reaction rate of polymer product increases and the molecular weight decreases. This decrease in molecular weight is not comparable to the decrease obtained by the use of mercaptan and other telogen molecular weight modifier agents.

Emulsifiers employed in the polymerization systems are kept at a minimum concentration level to offset excessive foaming during the application of the latex interpolymer compositions in coating operations, and to reduce the quantity of water-soluble constituents incorporated in the coatings which tend to increase the water sensitivity of the coatings. Emulsifiers which are applicable include both the water-soluble anionic emulsifiers, such as alkyl sulfate salts, alkyl aryl sulfonates, salts of fatty acids, alkyl sulfosuccinate salts, and the like, and the water-soluble nonionic emulsifiers, such as ethylene oxide-nonyl phenol adducts, aromatic sulfonate-formaldehyde condensation products, glycerol-fatty acid derivatives, polyoxylated sorbitan fatty acid derivatives, oxethylated amides, and the like. An anionic emulsifier is employed at a concentration of between 0.25 and 2.0 weight percent based on the total weight of monomers, with 0.5 to 1.0 weight percent being the preferred range. A nonionic emulsifier is employed at a concentration of between 0.5 and 6.0 weight percent based on the total weight of monomers, with 1.5 to 3.0 weight percent being the preferred range. It was observed that superior latex coating compositions are obtained consistently when a mixture of nonionic and anionic emulsifiers are employed rather than either the nonionic or anionic emulsfier alone. An anionic emulsifier used alone tends to produce very small interpolymer particles and causes excessive foaming in latex coating operations. A nonionic emulsifier used alone tends to produce large interpolymer particles and causes less water resistance in a film cast from the latex interpolymer composition. The anionic-nonionic mixed emulsifier system modifies the effect of each emulsifier so that a latex composition is obtained that has small interpolymer particle size and can be cast without excessive foaming into films having excellent water resistance. A weight ratio of about 3 to 1 of nonionic emulsifier to anionic emulsifier is the preferred mixed emulsifier ratio. The quantity of mixed emulsifier in a given polymerization system is kept at a minimum concentration level, with the preferred amount ranging between about 1.0 and 3.0 weight percent based on the weight of monomers. It is advantageous to employ the higher concentrations of emulsifier in a polymerization system when the vinyl carboxylic acid monomer content is high or when monomers are present which are difficult to emulsify such as styrene and acrylonitrile.

The amount of water employed in the emulsion polymerization reactions can vary between broad limits such as between 100 parts and 300 parts of water for every 100 parts of monomer mixture. The amount of water can be increased or decreased as desired to provide a latex having a higher or lower solids content (e.g., in the range between 25 to 50 percent solids).

The polymerization reactions are normally conducted under an atmosphere of an inert gas such as nitrogen, in a suitable vessel equipped with a stirrer, reflux column, thermometer and monomer feed and inert gas inlets. The water, emulsifier and catalyst are added to the vessel and the mixture of monomers and telogen molecular weight modifier is added with stirring and heating. The rate at which the monomer charge is added varies in a manner depending on the reactivity of the respective monomers. Styrene is an example of a monomer which polymerizes at a relatively slow rate as compared to acrylate monomers and acrylonitrile and other such monomers. A monomer mixture containing styrene, e.g., styrene/acrylonitrile/ethyl acrylate/acrylic acid, should be added into a polymerization reaction system at the rate of about 40 percent or 50 percent of the monomer charge per hour in order to allow sufficient time for the styrene to copolymerize and produce a fairly homogeneous resin. An acrylate/acrylonitrile/acrylic acid monomer mixture can be added at the rate of 60 percent to 90 percent of the mixture per hour to produce a satisfactory resin product.

After the monomer addition period is completed, the reaction is usually continued for an additional period of time between one-half hour and two hours. The final latex composition at the end of the polymerization reaction contains a dispersion of the interpolymer having an average particle diameter of between about 0.05 and 0.5 micron.

The interpolymer thus produced may be coagulated, e.g., by freezing or salting, then recovered and dissolved in a solvent to provide a solution coating capable of forming a continuous, glossy film on a substrate. However, the preferred compositions of this invention are derived from the latex dispersion without isolation of the interpolymer.

The interpolymer latex dispersions as produced have a pH in the acid range. Although these acidic latices can be formulated into coating compositions, better results can be obtained by adjusting the pH to at least 6.8 and preferably into the alkaline pH range. It is not ordinarily necessary to use a pH outside of the 7–10 range. Any alkaline material may be employed to adjust the pH which does not form a strong electrolyte. Metal hydroxides and amines are applicable, such as potassium hydroxide, piperidine, dimethylaniline, morpholine, monoethanolamine, triethanolamine, n-butylamine, and the like. Ammonium hydroxide is the particularly preferred alkaline reagent because of its low cost and high volatility. During a drying and/or baking cycle of a latex coating, ammonia is released from the ammonium carboxylate positions along the polymer chains and the resulting free carboxylic acid groups become available as reactive sites for cross-linking reactions and the like, and the free acid groups also serve to increase the adhesiveness of a coating on a substrate. The metal hydroxides have a tendency to permanently tie up the polymer carboxylic acid groups by salt formation and prevent them from being available as free carboxylic acid groups. The presence of metal ions in a coating also has the disadvantage of reducing the moisture resistance of the coating.

Latex formulations which do not have a pH in the basic range usually have poor mechanical stability and poor tolerance to organic solvents. Rapid stirring or the addition of a quantity of solvent will sometimes suffice to cause the dispersed resin to agglomerate and precipitate. The simple expediency of adjusting the pH of a latex formulation into the alkaline range provides several outstanding advantages. Excellent stability of both a mechanical and chemical nature is imparted to the composition. The "ionic" carboxylate salt groups formed at the carboxyl positions along the polymer chain act as a built-in "protective colloid." The presence of these "ionic" positions in the polymer chain gives the polymer an outstanding ability to disperse pigments and other inorganic materials in a latex coating formulation. Also, when the latices are applied to metal substrates a pH in the alkaline range prevents corrosion of the metal substrates. A pH in the 8 to 10 range is especially advantageous for preventing corrosion of metal substrates. Other advantages of adjusting the latex pH into the alkaline range by the use of ammonia have already been mentioned.

To obtain the full advantages of the latex compositions in coating applications, filming aid components must be included in the compositions. Many of the conventional filming aids are qualified to be incorporated in the latex compositions in that they minimize foaming during a coating operation and promote resin fusion and flow to a satisfactory degree. The total amount of filming aid employed should not exceed about 50 weight percent in the latex compositions, based on the weight of interpolymer, and preferably the filming aid is in the range from about 5 to 50 weight percent, based on the weight of interpolymer. Filming components that are useful include 2-ethylhexanol, methyl phenyl carbinol, ethylene glycol, diethylene glycol, acetophenone, butoxyethoxyethyl acetate, butylbenzylphthalate, dimethylformamide, undecanol, diacetone alcohol, ethylene carbonate, tetramethylene sulfone, dibutylstearamide, butoxyethoxyethanol, ethoxyethoxyethanol, alkyl monoethers of ethylene glycol, and the like. The amount of filming aid employed is preferably kept to a minimum in order not to increase the cost of the latex coating composition or lose the advantage of coatings which are not noxious or hazardous as are the solution coating compositions. A mixture of filming aid components is usually preferred in a latex composition to obtain various desirable effects in a coating application. For example, 1 to 10 parts ethylene glycol/5 to 10 parts 2-ethylhexanol/10 to 25 parts methyl phenyl carbinol/5 to 10 parts acetophenone, the total weight being between about 15 and 50 weight percent based on the weight of interpolymer, is exemplary of a filming aid mixture which has outstanding effects in combination with a latex coating composition. The ethylene glycol improves freeze-thaw stability of the latex composition and retards the drying rate of an applied coating so that better leveling and more continuous coatings are realized. 2-ethylhexanol serves as an excellent antifoam agent. Acetophenone and methyl phenyl carbinol are low cost, emulsifiable solvents which soften the latex interpolymer to allow formation of a continuous coating film even at room temperature.

The alkaline latex coating compositions of this invention containing a quantity of preferred highly reactive epoxide cross-linking agent and filming aid are especially adapted for baked coating applications. The interpolymers of the latex compositions have a high capacity for spontaneously wetting and dispersing pigments, and other such materials, in comparison to the conventional interpolymers in latex compositions. The flow of the interpolymer and the cross-linking reaction are in a critical relationship to each other during the baking period. The interpolymer must flow, wet pigments and the like, level and allow volatile materials to pass off before the cross-linking process has "set" the coating into a hard, infusible film. The preferred highly reactive epoxide cross-linking agents are uniquely adapted to "set" at exactly the right time in baked coating applications with an efficiency that results in the production of coatings that are outstanding in their quality. It is essential that the inter-polymer-filming aid system has the proper flow character and the cross-linking agent has the proper reactivity, relative to each other, if high quality baked coatings are to be realized. The interpolymer compositions of this invention containing a preferred highly reactive cross-linking agent and filming aid perform properly in the critical interaction of interpolymer flow and cross-linking and produce the highest quality baked coatings.

The method of mixing components to form a latex coating composition is not critical. Filming aids, pigments, cross-linking agents, and the like, can be incorporated into a latex coating composition to form a homogeneous mixture simply by adding the materials with stirring. While it is possible to combine pigments and the like with the latex dispersion of interpolymer and to grind the mixture on a three-roll mill or in a colloid mill, etc., it is desirable to prepare a paste of pigment or color in water with the aid of a dispersing agent and combine such pastes with the latex composition. In the preparation of such pigment pastes, it is best to mix the water, pigment and dispersing agent, and grind the mixture in a pebble mill, roll mill, colloid mill, high speed stone mill or high shear mixer. The consistency of the paste is controlled by the dispersing agent and the amount of water used. Sometimes a small portion of the latex liquid may be added to the pigment paste to be ground.

The weight of pigment in the latex paint compositions can vary between about 25 weight percent and 250 weight percent, based on the weight of resin. About 50 weight percent of pigment, based on the weight of resin in a latex paint composition, produces excellent properties in an applied coating. Well-known conventional pigments can be employed such as titanium dioxide, carbon black, cadmium sulfide, cadimium selenide, copper phthalocyanine, zinc oxide, zinc sulfide, iron oxide, calcium carbonate, chromium oxide, barium sulfate, calcium silicate, basic lead carbonate, and the like.

In another aspect of this invention, it has been discovered that powdered metals, e.g., aluminum, bronze, stainless steel, and the like, can be incorporated in the latex compositions and applied to a substrate to form a coating comparable in quality to the "glamour" automobile coatings popular in that industry. The application of this type of metal-containing latex paint to form coatings of acceptable quality has not been possible before the instant teaching.

The latex coating compositions of this invention have certain advantages over solution type coating compositions that have a solvent vehicle. The latex compositions are non-flammable and have low toxicity. They are easy to handle, there is less cleanup problem in a coating operation and there is little solvent disposal problem. The higher solids content of the latex systems allows the formation of thicker coatings from fewer applications. Also, the difference in cost between a water vehicle and a solvent vehicle in a coating composition is considerable.

In addition to the advantages over solution type coating compositions, the latex compositions of this invention which contain a cross-linking agent have important advantages over prior art latex coating compositions in the art. It has been observed that by following the teachings hereinbefore set forth, the preferred latex compositions containing low-cost organic filming aid form coatings which are at least comparable to solution type coatings in general appearance and degree of hardness and gloss. The coatings from these preferred latex compositions have excellent adhesion to all substrates tested thus far, e.g., steel, aluminum, copper, glass, wood, and the like, and have moisture resistance and solvent resistance comparable to the coatings from solution systems presently available in commercial quantities.

From the foregoing description, it is apparent that, in the preferred embodiments, this invention teaches the production of protective coatings from latex compositions superior to those from the known latex compositions of the art.

The examples described hereinafter will serve to illustrate particular embodiments of this invention. Various standard methods for determining physical properties of coatings are described in the examples. Unless otherwise indicated, the test results are rated in terms of relative numerical values between zero and ten. A rating of ten represents a near perfect coating, whereas a rating of zero represents complete failure of the coating in a given test. The particular tests employed are as follows:

*Florida exposure test.*—Baked latex metal coatings are sent to Southern Testing Service Company outside Miami, Florida, for six months' exterior exposure. The panels are exposed at a 45° angle to the south and the periodic rating of these test panels indicate a relative measure of light stability of the latex metal coatings. A general idea is also obtained of their weathering durability (gloss retention, chalking, checking, blistering, etc.) under hot tropical conditions.

After six months Florida exposure, various white topcoat latex paint compositions of this instant invention applied directly to bonderized steel without use of a primer, showed results comparable to standard automotive lacquers and enamels. Gloss retention was superior to standard enamels and equivalent to lacquers.

*Humidity test.*—Scribed latex coated panels are suspended in a box with a controlled atmosphere of 100 percent relative humidity and 50° C. temperature. Moisture condenses on the face of the panels and runs off. The panels are periodically dried in the laboratory and are inspected for gloss retention, blistering, adhesion failure, softening, swelling, peeling, etc. This alternate wetting-drying of the finish simulates such conditions as dew formation and evaporation, rainfall, washings, etc.

The automotive industry requires 500 hours' exposure in this box with no change while the appliance industry desires one thousand hours.

Most of the preferred latex finishes produced by the practice of this invention did not show any change after 1200 hours of testing.

*Salt spray test (ASTM B–117–49T).*—Scribed latex coated panels are placed in a controlled atmosphere box into which is fogged a 5 percent sodium chloride salt solution at 35° C.–36° C. This tests the coating's resistance to a corrosive atmosphere. The automotive industry requires 300 hour exposure with no change while the appliance industry desires at least 500 hours.

Most formulations of this invention tested were in excellent condition after 300 hours' exposure. These formulations were superior to some standard automotive paints that were tested.

*Water immersion test (ASTMD–870–51T).*—Scribed metal coatings are immersed in aerated water at 35° C.–36° C. to test the permeability and continuity of the coating. If the coating is permeable to moisture or if tiny pinholes exist, considerable rusting will develop. The automotive industry requires 500 hours' exposure with no change.

Various latex coatings of this invention were in excellent condition after 500 hours of testing.

*Gravelometer test.*—This is an impact test used by the automotive industry to simulate flying pebbles and rocks under highway conditions. A panel is suspended in a metal frame and blasted with one pint of quarter-inch limestone chips propelled from an orifice by a 90 p.s.i.g. air blast. Rating of the test coatings is made by comparison to a standard.

Latex coating systems of this invention have rated equal to or superior to automotive standard paints in this test.

*Solvent resistance.—Gasoline.*—A coated panel is rubbed with high octane gasoline and the degree of coating softening or paint removal is noted. Latex coatings of this invention have rated well in this test.

*Grease resistance.*—A test panel is immersed in grease at 25° C. for thirty days and inspected for any change in appearance or characteristics. Latex coatings of this invention tested have rated excellent in this test.

*Soap resistance.*—A test panel is immersed in one percent "Tide" solution at 74° C. for seven days. Latex coatings of this invention tested have rated well in this test.

*Alkali resistance.*—A coated test panel is immersed in 3 percent caustic (NaOH) for seven days at 25° C. Latex coatings of this invention have rated excellent in this test.

*Cycling test.*—A test panel is alternately immersed in a hot water bath at 65° C. for five minutes and then into a 75-ethylene glycol/25-water solution cooled to −51° C. with Dry Ice for five minutes. This cycle is repeated fifteen times. The test checks the coating toughness or ability to withstand repeated rapid temperature changes without checking, cracking, or losing adhesion. Various latex coatings of this invention tested have rated equivalent to standard automotive paints in this test.

*Control panel testing.—Gloss retention.*—Portion of test panel kept out of light to preserve original appearance and gloss until all tests are completed.

*Adhesion.*—A coating is given a relative rating by removing a portion from a substrate with a sharp blade. A more accurate determination of adhesion is accomplished with a Hesiometer machine which plots the exact force required for a standard cutting edge to strip a cutting from a standard metal surface. In this test, latex coatings of this invention showed four to six times the adhesion capacity of commercial automotive paint control panels.

*Impact resistance test (Gardner impact tester).*—A coating is rapidly distended by dropping a known weight through a known distance onto a coated panel, causing a deep hemispherical indentation. The automotive industry requires paints to withstand 28 inch-pounds without cracking or peeling on the concave side of the indentation. Various latex coatings of this invention have been rated at 24–160 inch-pounds resistance.

*Mandrel test (ASTM D-522-41).*—As another check on the balance of adhesion against distensibility, a coated panel is rapidly bent through a 180° angle in a conical shape measuring ⅛-inch to 2¼ inches from apex of the cone to the base. No cracking or crazing of coating should occur. Various latex coatings of this invention performed fair to excellent in this test.

*Gloss rating test (ASTM D-523).*—The surface gloss of the coating is measured by a 60° reflecting glossmeter using a reading of 96 as standard. Even before polishing, latex finishes of this invention rate 95–105 against the 96 standard. In general, the latex coatings have excellent gloss.

The testing of the physical properties of protective coatings formed from the latex compositions was accompanied by simultaneous testing of commercial paint coatings for purposes of comparison. In appended Table 1 of test results for the examples, the commercial paints are identified by the following symbols:

C-1—Baked green enamel over Du Pont standard iron oxide primer (828–032).
C-2—Baked cashmere blue "Lucite" lacquer over Du Pont standard iron oxide primer (828–032).
C-3—Baked nitrocellulose lacquer over Du Pont standard iron oxide primer (828–032).
C-4—Baked latex white paint (from Example 2) over Du Pont standard iron oxide primer (828–032).
C-5—Baked latex white paint (from Example 3) over Du Pont standard iron oxide primer (828–032).

The various "trade-name" materials specified in the examples have the following designated composition:

Duponol Me—Sodium lauryl sulfate.
Tergitol NPX—Ethylene oxide adduct derivative of nonyl phenol; specific gravity 20/20° C., 1.066; solidification temperature, 0° C.
Tamol "731"—Carboxylated polyelectrolyte sodium salt.
Triton CF–10—Alkyl aryl ether (Rohm and Haas).
Triton X–100—Alkyl aryl polyether alcohol (Rohm and Haas).
Barytes—Barium sulfate.
Wollastonite P–1—51.5% silicon dioxide, 47.5% calcium oxide.
Brown iron oxide—Ferric oxide (VVF–B2093F).
Red iron oxide—Ferric oxide (R–8098).
Talc (Nytal 300)—Magnesium silicate.
Ketosol "75"—75% methyl phenyl carbinol/25% acetophenone.
Calgon—Sodium pyrophosphate.
Foamex—Modified alkyl esters; specific gravity 25/25° C., 0.96–0.97 (Glyco Products Company).
Butyl "Carbitol" acetate—Butyl diethyleneglycol acetate.
Nopco 1497–V—Anionic surface active blend of processed saturated fats of sulfated high melting point derivatives.
Darvan No. 1—Sodium salt of polymerized alkyl aryl sulfonic acid (R. T. Vanderbilt).
BRLA–1030—Bakelite trimethylolphenol.
Santicizer 160—Butyl benzyl phthalate.

EXAMPLE 1

*Latex Preparation*

A two-liter flask was fitted with a driven stirrer, reflux condenser, thermometer, gravity feed monomer tank, an inert gas inlet and a controlled temperature water bath. The polymerization was accomplished by charging the assembled apparatus with:

| | Grams |
|---|---|
| Water (dionized) | 530 |
| Potassium persulfate $K_2S_2O_8$ | 2 |
| Duponol Me | 2.5 |
| Tergitol NPX | 7.5 |

Air was flushed out of the closed reaction flask with nitrogen at atmospheric pressure. The water bath surrounding the reaction flask was heated to a temperature of 75° C., and controlled addition of the follow monomer-telogen solution was commenced:

| | Grams |
|---|---|
| Styrene | 180 |
| Ethyl acrylate | 160 |
| Acrylonitrile | 40 |
| Acrylic acid | 20 |
| t-Octyl mercaptan | 2 |

The feed was added at 45 percent to 50 percent per hour. On completion of monomer addition (2 hours), the latex was held at 75° C. to 77° C. for thirty minutes to allow complete reaction of residual monomers.

The latex product was then cooled to 25° C. and neutralized with 50 grams of ammonium hydroxide (10 percent solution). The addition of ammonium hydroxide to the latex produced excellent chemical and mechanical stability. The latex had a solids content ($T_s$) of 40.7% and a pH of 8. The latex resin had a reduced viscosity ($I_r$) of 0.29 and a second order transition temperature ($T_G$) of 56° C.

A 10-mil wet film of latex was cast on a glass plate, air-dried and then baked at a temperature of 149° C. for fifteen minutes to form a continuous film with excellent adhesion to the glass substrate. This melt and flow characteristic of the latex resin illustrates the effect of low molecular weight. A resin of the same composition but having unmodified molecular weight ($I_r$=1.5 to 3.5) does not display either this melt-flow characteristic or the same solubility characteristics in the presence of a filming aid and/or plasticizer.

*Latex Metal Paint Preparation*

A predispersion or pigment paste was made of white titanium dioxide ($TiO_2$, R-510) pigment in water as follows:

| | Grams |
|---|---|
| Water | 200 |
| Calgon | 4 |
| $TiO_2$ (R-510) | 800 |

These materials were stirred together to form a highly thixotropic (high viscosity at low shear rate) slurry of dispersing pigment in water. The slurry was ground in a pebble mill for twenty-four hours to achieve complete dispersion. Portions of this pigment predispersion were then used to convert some of the following latex examples into white metal finishes. Dry pigments can be added directly to latex compositions and dispersed, but the preparation of a predispersion has been found to be convenient.

A white metal paint was prepared from the above latex with the following formulation:

| | Grams |
|---|---|
| Latex | 300 |
| Water | 100 |
| Pigment predispersion ($TiO_2$, R-510) (80% $T_s$) | 37.5 |
| Tributyl phosphate | 12 |
| Foamex | 12 |
| Butyl "Carbitol" acetate | 12 |
| 3,4 - epoxy-6-methylcyclohexylmethyl 3,4-epoxy-6-methylcyclohexanecarboxylate (87% pure) | 12 |

These ingredients were mixed in order with constant stirring. The resulting paint was sprayed on unprimed bonderized steel panels, allowed to air-dry fifteen minutes, baked fifteen minutes at a temperature of 82° C. and then thirty minutes at 149° C. A smooth, continuous, hard, highly glossy metal finish resulted. The adhesion of these metal finishes was found to be excellent. As measured on the Hesiometer (a device for measuring the force required to remove a coating from a metal substrate) these latex finishes were found to have a four to six times the adhesive capacity of conventional commercial solution coatings finishes. In the Florida exposure test, the metal finish had an excellent rating (a relative value of 8). Other test data are summarized in appended Table 2.

EXAMPLE 2

The following ingredients were polymerized in a ten gallon glass-lined autoclave in the same manner as in Example 1 except for the addition of more water during the neutralization step:

| | Lbs. |
|---|---|
| Water (deionized) | 146.5 |
| Potassium persulfate ($K_2S_2O_8$) | 0.5 |
| Duponol Me | 0.5 |
| Tergitol NPX | 1.5 |
| Styrene | 45 |
| Ethyl acrylate | 40 |
| Acrylonitrile | 10 |
| Acrylic acid | 5 |
| t-Butyl mercaptan | 0.375 |
| $NH_4OH$ (2.8% solution) | 55 |

The recovered latex had a solids content of 32.5% and a pH of 7.4. The latex resin had a reduced viscosity ($I_r$) of 0.28 and a second order transition temperature ($T_G$) of 56° C.

*Metal Primer Paint Formulation*

As in Example 1, a water dispersed pigment paste was prepared prior to paint formulation. This pigment paste consisted of the following:

| | Grams |
|---|---|
| Water | 750 |
| Nopco 1497-V | 8.3 |
| Tamol "731" (25% active) | 46.5 |
| Triton X-100 | 8.3 |

These materials were stirred together until a continuous emulsion was formed. To this emulsion the following were added in increments:

| | Grams |
|---|---|
| Talc (Nytal 300) | 210 |
| Barytes No. 1 | 950 |
| Red iron oxide (R-8098) | 950 |

These ingredients were mixed in order with constant stirring, and the thixotropic pigment predispersion was passed through a high speed Morehouse mill four times to produce a smooth fluid pigment dispersion.

An iron oxide metal primer paint was completed as follows:

| | Grams |
|---|---|
| Latex (32.5%) | 307 |
| Iron oxide pigment dispersion | 270 |
| Ethylene glycol | 10 |
| Ketosol "75" | 30 |
| 2-ethylhexanol | 10 |
| 3,4 - epoxy-6-methylcyclohexylmethyl 3,4 - epoxy-6-methylcyclohexanecarboxylate | 12 |

These ingredients were mixed in order with constant stirring and applied to bonderized steel panels by spraying in two double coats, air-dried fifteen minutes, baked fifteen minutes at a temperature of 80° C. and then thirty minutes at 149° C. A smooth, continuous, hard, adherent metal primer resulted which was wet-sanded and topcoated with a white metal paint formulated as follows:

| | Grams |
|---|---|
| Latex | 307 |
| $TiO_2$ pigment predispersion (80% $T_s$) | 62 |
| $NH_4OH$ | 1 |
| Ethylene glycol | 10 |
| 2-ethylhexanol | 10 |
| Ketosol "75" | 30 |
| 3,4-epoxy - 6 - methylcyclohexylmethyl 3,4-epoxy-6-methylcyclohexanecarboxylate | 12 |

These ingredients were mixed in order with constant stirring and the completed white metal paint was sprayed over the wet-sanded primer in two double coats, air-dried fifteen minutes, baked fifteen minutes at a temperature of 80° C. and then thirty minutes at 145° C. A smooth, continuous, hard, white latex metal finish with a high gloss resulted. In the Florida exposure test, the finish had an excellent rating (a relative value of 8). Other test data are summarized in appended Table 2.

A latex identical to that of Example 2 was prepared, formulated into paints with the compositions shown in Examples 3 through 20, and formed into hard, glossy finishes on bonderized steel in the same manner as in Example 2 except that a primer base coating was not employed. Test data are summarized in appended Tables 2 and 3.

EXAMPLE 3

| | Grams |
|---|---|
| Latex (39.5% $T_s$) | 710 |
| Water | 50 |

| | Grams |
|---|---|
| TiO$_2$ pigment paste | 90 |
| 2-ethylhexanol | 28 |
| Ketosol "75" | 28 |
| 3,4 - epoxy-6-methylcyclohexylmethyl 3,4 - epoxy-6-methylcyclohexanecarboxylate | 42 |

(Test data in Table 2.)

EXAMPLE 4

| | Grams |
|---|---|
| Latex (39.5% T$_s$) | 710 |
| TiO$_2$ pigment paste | 90 |
| Distilled water | 50 |
| 2-ethylhexanol | 28 |
| Ketosol "75" | 28 |
| Allyl 3,4-epoxy-6-methylcyclohexanecarboxylate | 30 |

(Test data in Table 2.)

EXAMPLE 5

| | Grams |
|---|---|
| Latex (39.5% T$_s$) | 710 |
| Water | 50 |
| TiO$_2$ pigment paste | 90 |
| 2-Ethylhexanol | 28 |
| Ketosol "75" | 28 |
| 3,4-epoxy-6-methylcyclohexylmethyl 9,10-epoxystearate | 63 |

(Test data in Table 2.)

EXAMPLE 6

| | Grams |
|---|---|
| Latex (39.5% T$_s$) | 710 |
| Water | 50 |
| TiO$_2$ pigment paste | 90 |
| 2-Ethylhexanol | 28 |
| Ketosol "75" | 28 |
| Bis(2,3-epoxycyclopentyl) ether | 28 |

(Test data in Table 2.)

EXAMPLE 7

| | Grams |
|---|---|
| Latex (39.5% T$_s$) | 710 |
| Water | 50 |
| TiO$_2$ pigment paste | 90 |
| 2-Ethylhexanol | 28 |
| Ketosol "75" | 20 |
| Vinyl cyclohexene dioxide | 21 |

(Test data in Table 2.)

EXAMPLE 8

| | Grams |
|---|---|
| Latex (59.5% T$_s$) | 710 |
| Water | 50 |
| TiO$_2$ pigment paste | 90 |
| 2-Ethylhexanol | 28 |
| Ketosol "75" | 28 |
| Allyl 3,4-epoxy-6-methylcyclohexanecarboxylate | 60 |

(Test data in Table 3.)

EXAMPLE 9

| | Grams |
|---|---|
| Latex (39.5% T$_s$) | 710 |
| Water | 50 |
| TiO$_2$ pigment paste | 90 |
| 2-Ethylhexanol | 28 |
| Ketosol "75" | 28 |
| 3-oxatricyclo[3.2.1.0$^{2,4}$]octane-6-methanol | 44 |

(Test data in Table 3.)

EXAMPLE 10

| | Grams |
|---|---|
| Latex (39.5% T$_s$) | 710 |
| Water | 50 |
| TiO$_2$ pigment paste (78% T$_s$) | 90 |
| 2-Ethylhexanol | 28 |
| Ketosol "75" | 28 |
| Mono(methylglycidyl) ethylene glycol | 35 |

(Test data in Table 3.)

EXAMPLE 11

| | Grams |
|---|---|
| Latex (39.5% T$_s$) | 710 |
| TiO$_2$ pigment paste (78% T$_s$) | 90 |
| Water | 50 |
| 2-Ethylhexanol | 28 |
| Ketosol "75" | 28 |
| Mono(methylglycidyl) diethylene glycol | 53 |

(Test data in Table 3.)

EXAMPLE 12

| | Grams |
|---|---|
| Latex (39.5% T$_s$) | 710 |
| Water | 50 |
| TiO$_2$ pigment paste | 90 |
| 2-Ethylhexanol | 28 |
| Ketosol "75" | 28 |
| 2,3-epoxy-2-methylpentyl 3,4 - epoxycyclohexanecarboxylate | 36 |

(Test data in Table 3.)

EXAMPLE 13

| | Grams |
|---|---|
| Latex (39.5% T$_s$) | 710 |
| Water | 50 |
| TiO$_2$ pigment paste | 90 |
| 2-Ethylhexanol | 28 |
| Ketosol "75" | 28 |
| Bis(2,3-epoxy-2-methylpropyl) ether | 24 |

(Test data in Table 3.)

EXAMPLE 14

| | Grams |
|---|---|
| Latex (39.5% T$_s$) | 710 |
| Water | 50 |
| TiO$_2$ pigment paste | 90 |
| 2-Ethylhexanol | 28 |
| Ketosol "75" | 28 |
| Diethylene glycol bis(3,4-epoxy-6-methylcyclohexanecarboxylate) | 57.5 |

EXAMPLE 15

| | Grams |
|---|---|
| Latex (39.5% T$_s$) | 710 |
| Water | 50 |
| TiO$_2$ pigment paste | 90 |
| 2-ethylhexanol | 28 |
| Ketosol "75" | 28 |
| Tetraethylene glycol bis(3,4-epoxy-6-methylcyclohexanecarboxylate) | 70 |

EXAMPLE 16

| | Grams |
|---|---|
| Latex (39.5% T$_s$) | 600 |
| Water | 40 |
| TiO$_2$ pigment paste | 76 |
| 2-ethylhexanol | 24 |
| Ketosol "75" | 24 |
| Polyethylene glycol [1] bis(3,4-epoxy-6-methylcyclohexanecarboxylate) | 88 |

[1] Average molecular weight of 400.

EXAMPLE 17

| | Grams |
|---|---|
| Latex (39.5% T$_s$) | 710 |
| Water | 50 |
| TiO$_2$ pigment paste | 90 |
| 2-ethylhexanol | 28 |
| Ketosol "75" | 28 |
| 3,4-epoxy-6-methylcyclohexyl-methyl 9,10,12,13-diepoxystearate | 67 |

EXAMPLE 18

| | Grams |
|---|---|
| Latex (39.5% T$_s$) | 710 |
| Water | 50 |
| TiO$_2$ pigment paste | 90 |
| 2-ethylhexanol | 28 |
| Ketosol "75" | 28 |
| Diglycidyl ether of 2,2(p-hydroxyphenyl)propane | 51 |

EXAMPLE 19

| | Grams |
|---|---|
| Latex (39.5% T$_s$) | 710 |
| Water | 50 |
| TiO$_2$ pigment paste | 90 |
| 2-ethylhexanol | 28 |
| Ketosol "75" | 28 |
| Trimethylol propane | 20 |

EXAMPLE 20

| | Grams |
|---|---|
| Latex (32.5% $T_s$) | 307 |
| Trimethylolphenol (70% $T_s$ in water) | 37 |
| Ethylene glycol | 10 |
| 2-ethylhexanol | 10 |
| Ketosol "75" | 30 |

The ingredients were mixed in order with stirring. A 10-mil wet film was cast on glass, allowed to air-dry, and then baked thirty minutes at 149° C. to form a hard, solvent-resistant coating.

A full paint formulation was prepared, employing the same latex (32.5% $T_s$) and trimethylolphenol, which was excellent for application as a primer paint:

| | Lbs. |
|---|---|
| Brown iron oxide | 316.13 |
| Barytes (W–1430) | 258.76 |
| Talc (Nytal 300) | 57.37 |
| Ethylene glycol | 22.25 |
| Latex (38.2% $T_s$) | 582.38 |
| Trimethylolphenol (70% $T_s$ in water) | 31.78 |
| Darvan No. 1 | 1.90 |
| Triton CF–10 | 2.53 |
| Pine oil | 1.26 |
| Butyl "Carbitol" acetate | 22.25 |
| Water (deionized) | 59.39 |

The latex metal primer was prepared by charging to a pebble mill the latex, water, Darvan No. 1, Triton CF–10 wetting agent, and the pine oil agent, mixing the ingredients well, adding the pigments, and then grinding the total mixture for twenty-four hours. The primer paint was completed by adding the pigmented latex to a paint mixer and adding ethylene glycol, butyl "Carbitol" acetate and trimethylolphenol with constant stirring. The completed primer paint had a solids content of 65%, a pH of 7.4, a consistency of 74 K.U., and a weight per gallon 13.56 lbs.

EXAMPLE 21

| | Grams |
|---|---|
| Styrene | 200 |
| β-Cyanoethyl acrylate | 180 |
| Acrylic acid | 20 |
| t-Butyl mercaptan | 2 |
| Duponol Me | 2 |
| Tergitol NPX | 6 |
| $K_2S_2O_8$ | 2 |
| Water | 600 |
| $NH_4OH$ (2.5% solution) | 200 |

A latex coating composition was prepared from the above formulation according to the general procedure of Example 1.

The latex had a solids content ($T_s$) of 34% and a pH of 7.8. The latex resin had a reduced viscosity ($I_r$) of 0.24 and a second order transition temperature ($T_G$) of 49° C. to 51° C. Employing the filming aid system of Example 1, the latex composition was cast on substrates, and hard, glossy coatings were obtained by baking as in the previous examples.

EXAMPLE 22

| | Grams |
|---|---|
| Methyl methacrylate | 280 |
| Ethyl acrylate | 60 |
| Acrylonitrile | 40 |
| Acrylic acid | 20 |
| t-Butyl mercaptan | 2 |
| Duponol Me | 2.5 |
| Tergitol NPX | 7.5 |
| $K_2S_2O_8$ | 2 |
| Water | 600 |
| $NH_4OH$ (28% solution) | 18 |

$T_s=39.7\%$; $I_r=0.29$; $T_G=95°$ C.; pH=8.2.

A latex composition was prepared from the above formulation and the indicated physical properties were determined. Hard, glossy coatings were obtained when the latex composition was sprayed on metal and baked in the manner of the previous examples.

EXAMPLE 23

| | Grams |
|---|---|
| Styrene | 140 |
| 2-ethylhexyl acrylate | 140 |
| Acrylonitrile | 100 |
| Acrylic acid | 20 |
| t-Butyl mercaptan | 2 |
| Duponol Me | 2.5 |
| Tergitol NPX | 7.5 |
| $K_2S_2O_8$ | 2 |
| Water | 600 |
| $NH_4OH$ (28% solution) | 16 |

$T_s=39.5\%$; $I_r=0.34$; $T_G=47°$ C.; pH=8.7.

The latex was polymerized and neutralized in a conventional manner. Three paints were made from this latex to determine its adaptability to different types of pigments. The respective paints were prepared with: (1) the conventional titanium dioxide (R–510); (2) predispersed carbon black pigment in water at 20 percent total solids; and (3) Solfast sky blue toner from Sherwin-Williams. The formulations were as follows:

(1)

| | Grams |
|---|---|
| Latex (32.5% $T_s$) | 307 |
| $NH_4OH$ (28% solution) | 3 |
| $TiO_2$ predispersed pigment | 50 |
| Ethylene glycol | 10 |
| 2-ethylhexanol | 10 |
| Ketosol "75" | 30 |
| 3,4 - epoxy - 6 - methylcyclohexylmethyl 3,4-epoxy-6-methylcyclohexanecarboxylate | 11 |

(2)

| | Grams |
|---|---|
| Latex (32.5% $T_s$) | 307 |
| $NH_4OH$ (28% solution) | 3 |
| Predispersed carbon black pigment (20% $T_s$) | 15 |
| Ethylene glycol | 10 |
| 2-ethylhexanol | 10 |
| Ketosol "75" | 30 |
| 3,4 - epoxy - 6 - methylcyclohexylmethyl 3,4-epoxy-6-methylcyclohexanecarboxylate | 11 |

(3)

| | Grams |
|---|---|
| Latex (32.5% $T_s$) | 307 |
| $NH_4OH$ (28% solution) | 3 |
| $TiO_2$ predispersed pigment | 40 |
| Solfast sky blue toner | 20 |
| Ethylene glycol | 10 |
| 2-ethylhexanol | 10 |
| Ketosol "75" | 30 |
| 3,4 - epoxy - 6 - methylcyclohexylmethyl 3,4-epoxy-6-methylcyclohexanecarboxylate | 11 |

The ingredients were mixed in order with constant stirring. The paints were applied to unprimed bonderized steel panels by spraying in a conventional maner. The three paints produced coatings representing three colors: white, black and blue. All had high gloss, excellent adhesion, and suitable hardness.

EXAMPLE 24

| | Grams |
|---|---|
| Styrene | 100 |
| Ethyl acrylate | 220 |
| Acrylonitrile | 60 |
| Acrylic acid | 20 |
| t-Dodecyl mercaptan | 4 |
| Duponol Me | 2.5 |
| Tergitol NPX | 7.5 |
| $K_2S_2O_8$ | 2 |
| Water | 700 |

| | Grams |
|---|---|
| NH$_4$OH (14% solution) | 34 |

T$_s$=35.5%; T$_G$=45° C., I$_r$=0.21; pH=9.

The latex was prepared according to the procedure of Example 1. A white metal coating paint was formulated from the latex as follows:

| | Grams |
|---|---|
| Latex (35.5% T$_s$) | 285 |
| Water | 20 |
| NH$_4$OH (28% solution) | 2 |
| TiO$_2$ pigment predispersion | 32 |
| Ethylene glycol | 10 |
| Ketosol "75" | 30 |
| 2-ethylhexanol | 10 |
| 3,4-epoxy-6-methylcyclohexylmethyl 3,4-epoxy-6-methylcyclohexanecarboxylate (93% pure) | 12 |

These ingredients were mixed in order with constant stirring and placed on can rolls overnight to insure more complete mixing. The latex paint was sprayed on bonderized unprimed steel panels at 35 p.s.i.g. gun pressure and allowed to air-dry thirty minutes. They were then force-dried ten minutes at 80° C. and second coated. After a thirty-minute additional air-dry, the second coat was force-dried at 66° C. for ten minutes and baked thirty minutes at 149° C. In the Florida exposure test, the coatings had a perfect rating (a relative value of 10). Other test data are summarized in appended Table 3.

EXAMPLE 25

| | Grams |
|---|---|
| Acrylonitrile | 180 |
| Ethyl acrylate | 200 |
| Acrylic acid | 20 |
| t-Butyl mercaptan | 2 |
| Duponol Me | 2.5 |
| Tergitol NPX | 7.5 |
| K$_2$S$_2$O$_8$ | 2 |
| Water | 700 |
| NH$_4$OH (8% solution) | 100 |

T$_s$=33.5%; I$_r$=0.37; T$_G$=53° C., pH=8.1.

The latex was prepared and neutralized in the conventional manner. A clear, yellowish film cast and baked on a glass slide from the latex formulated as a primer paint without the pigment showed excellent solvent resistance and adhesion. In the Florida exposure test, the formulation had a high rating (a relative value of 7). Other test data are summarized in appended Table 4.

EXAMPLE 26

| | Grams |
|---|---|
| Styrene | 180 |
| Ethyl acrylate | 160 |
| Acrylonitrile | 40 |
| Methacrylic acid | 20 |
| t-Butyl mercaptan | 2 |
| Duponol Me | 2.5 |
| Tergitol NPX | 7.5 |
| K$_2$S$_2$O$_8$ | 2 |
| Water | 478 |
| NH$_3$ gas | 3.5 |

T$_s$=44%; I$_r$=0.34; T$_G$=57° C., pH=7.5.

Polymerization in this example was accomplished according to the general procedure. A basic pH and latex stability were obtained by passing ammonia gas over the surface of the unstable latex while still hot, thereby accomplishing neutralization of the carboxyl groups with the ammonia gas.

EXAMPLE 27

| | Grams |
|---|---|
| Styrene | 280 |
| Acrylonitrile | 100 |
| Acrylic acid | 20 |
| t-Butyl mercaptan | 2 |
| Duponol Me | 2.5 |
| Tergitol NPX | 7.5 |
| K$_2$S$_2$O$_8$ | 2 |
| Water | 464 |
| NH$_4$OH (14% solution) | 32 |

T$_s$=45.3%; I$_r$=0.29; T$_G$=98°–100° C.; pH=7.6

A white metal coating was prepared from the above latex as follows:

| | Grams |
|---|---|
| Latex (45.3% T$_s$) | 331 |
| Water | 69 |
| TiO$_2$ pigment dispersion (78% T$_s$) | 96 |
| Ethylene glycol | 12.5 |
| 2-ethylhexanol | 15 |
| Ketosol "75" | 30 |
| 3,4-epoxy-6-methylcyclohexylmethyl 3,4-epoxy-6-methyl-cyclohexanecarboxylate | 28 |

The above were mixed in order and applied directly to bonderized steel panels in two double coats. The finish was air-dried thirty minutes, baked fifteen minutes at a temperature of 82° C. and then thirty minutes at 149° C. The coatings were glossy, extremely hard, brittle under impact, and had excellent adhesion.

EXAMPLE 28

| | Grams |
|---|---|
| Styrene | 200 |
| Butyl acrylate | 140 |
| Acrylonitrile | 40 |
| Acrylic acid | 20 |
| t-Butyl mercaptan | 2 |
| Duponol Me | 2.5 |
| Tergitol NPX | 7.5 |
| K$_2$S$_2$O$_8$ | 2 |
| Water | 464 |
| NH$_4$OH (3.2% solution) | 122 |

T$_s$=41%; I$_r$=0.46; T$_G$=58° C.; pH=8.

A white metal coating paint was prepared from the above latex as follows:

| | Grams |
|---|---|
| Latex (T$_s$=35%) | 428 |
| TiO$_2$ predispersed pigment (78% T$_s$) | 96 |
| Ethylene glycol | 7.5 |
| 2-ethylhexanol | 15 |
| Ketosol "75" | 30 |
| 3,4-epoxy-6-methylcyclohexylmethyl 3,4-epoxy-6-methylcyclohexanecarboxylate | 28 |

The above ingredients were mixed in order with constant stirring and applied to wet-sanded, latex primed steel panels in two double coats, air-dried fifteen minutes, baked fifteen minutes at a temperature of 80° C. and then thirty minutes at 149° C. A glossy, hard, white finish resulted. The latex primer undercoat was formulated and applied in the identical manner of Example 2. Test data are summarized in appended Table 4.

EXAMPLE 29

| | Grams |
|---|---|
| Styrene | 180 |
| Methyl acrylate | 156 |
| Acrylonitrile | 40 |
| Methacrylic acid | 24 |
| t-Butyl mercaptan | 2 |
| Duponol Me | 2.5 |
| Tergitol NPX | 7.5 |
| K$_2$S$_2$O$_8$ | 2 |
| Water | 464 |
| NH$_4$OH (14% solution) | 30 |

T$_s$=45.8%; I$_r$=.34; T$_G$=61° C.; pH=7.7.

The following paint formulation was prepared from this latex and applied directly to bonderized steel without a latex primer in two double coats, according to the general procedure of the previous examples, to provide hard, glossy coatings. Test data are summarized in appended Table 4.

| | Grams |
|---|---|
| Latex ($T_s=45.8\%$) | 327 |
| Water | 73 |
| $TiO_2$ pigment paste | 96 |
| Ethylene glycol | 7.5 |
| 2-ethylhexanol | 15 |
| Ketosol "75" | 30 |
| 3,4-epoxy-6-methylcyclohexylmethyl 3,4-epoxy-6-methylcyclohexanecarboxylate | 28 |

EXAMPLE 30

| | Grams |
|---|---|
| Methyl methacrylate | 300 |
| 2-ethylhexyl acrylate | 150 |
| Acrylonitrile | 120 |
| Acrylic acid | 30 |
| t-Butyl mercaptan | 3 |
| Duponol Me | 3.75 |
| Tergitol NPX | 11.25 |
| $K_2S_2O_8$ | 3 |
| Water | 696 |
| $NH_4OH$ (2.8% solution) | 283 |

$T_s=38.4\%$; $I_r=0.35$; $T_G=59°$ C.; pH=7.0.

| | Primer | Topcoat |
|---|---|---|
| Latex (35% $T_s$), grams | 428 | 428 |
| Iron oxide pigment dispersion (72% $T_s$), grams | 313 | |
| $TiO_2$ pigment disperion, grams | | 96 |
| Water, grams | | 34 |
| Ethylene glycol, grams | 7.5 | 7.5 |
| 2-Ethylhexanol, grams | 15 | 15 |
| Ketosol "75", grams | 30 | 30 |
| 3,4-Epoxy-6-methylcyclohexyl-methyl 3,4-epoxy-6-methyl-cyclohexanecarboxylate, grams | 28 | 28 |

The ingredients of the metal latex primer were mixed in order with constant stirring. The primer paint was applied to bonderized steel panels in two double coats, air-dried fifteen minutes, baked fifteen minutes at a temperature of 80° C., and then thirty minutes at 149° C. The components of the white latex paint were also mixed together in order with constant stirring, sprayed over the wet-sanded latex metal primer, air-dried fifteen minutes, baked fifteen minutes at 80° C. and then thirty minutes at 149° C. The resulting white, metal finishes were hard and glossy. Test data are summarized in appended Table 4.

EXAMPLE 31

| | Grams |
|---|---|
| Methyl methacrylate | 340 |
| 2-ethylhexyl acrylate | 40 |
| Acrylic acid | 20 |
| t-Dodecyl mercaptan | 1 |
| Duponol Me | 2.5 |
| Tergitol NPX | 7.5 |
| $K_2S_2O_8$ | 2 |
| Water | 500 |
| $NH_4OH$ (10% solution) | 87 |

$T_s=40.5\%$; $I_r=0.74$; $T_G=100°$ C.; pH=8.5.

A white latex metal coating was prepared from the methyl methacrylate latex as follows:

| | Grams |
|---|---|
| Latex | 428 |
| $TiO_2$ pigment predispersion | 96 |
| Ethylene glycol | 10 |
| 2-ethylhexanol | 15 |
| Ketosol "75" | 37.5 |
| 3,4-epoxy-6-methylcyclohexylmethyl 3,4-epoxy-6-methylcyclohexanecarboxylate | 17 |

These ingredients were mixed in order with constant stirring and sprayed on primed panels in two double coats. A glossy, hard, white finish was obtained, after subjecting the panels to the conventional bake schedule. The primer coating was an iron oxide composition prepared and applied as in Example 2. Test data are summarized in appended Table 4.

EXAMPLE 32

| | Grams |
|---|---|
| Methyl methacrylate | 300 |
| Acrylonitrile | 80 |
| Acrylic acid | 20 |
| t-Butyl mercaptan | 1 |
| Duponol Me | 1.5 |
| Tergitol NPX | 7.5 |
| $K_2S_2O_8$ | 2 |
| Water | 500 |
| $NH_4OH$ (10% solution) | 87 |

$T_s=40\%$; $I_r=0.80$; $T_G=99°$ C.; pH=7.5.

A white latex metal finish was prepared from this latex in a manner identical to that of Example 31 except that 100 grams of additional water was added to adjust the viscosity for spraying. The paint was applied in two double coats over the same iron oxide primer employed in Example 31, air-dried fifteen minutes, baked fifteen minutes at a temperature of 82° C. and thirty minutes at 149° C. A hard, semi-gloss finish resulted which polished to a superior gloss. Test data are summarized in appended Table 4.

EXAMPLE 33

| | Grams |
|---|---|
| Styrene | 300 |
| 2-ethylhexyl acrylate | 150 |
| Acrylonitrile | 120 |
| Acrylic acid | 30 |
| t-Butyl mercaptan | 1.5 |
| Duponol Me | 3.75 |
| Tergitol NPX | 11.25 |
| $K_2S_2O_8$ | 3 |
| Water | 696 |
| $NH_4OH$ (14% solution) | 55 |

$T_s=45.1\%$; $I_r=0.51$; $T_G=63°$ C.; pH=7.

This latex (B) was prepared in the same manner as in Example 1. In order to illustrate the coating characteristics attributable to varying molecular weight, two more latices (A and C) of identical monomer composition but differing in molecular weight ($I_r$) only were formulated and their comparative coating properties were determined. Primers were prepared from these three latices from the same pigment dispersion as follows:

| | Grams |
|---|---|
| Water | 400 |
| Tamol 731 (25% active) | 10 |
| Triton CF-10 | 5 |
| Pine oil | 10 |
| Wollastonite P-1 | 600 |
| Red iron oxide R-8098 | 300 |
| Talc (Nytal 300) | 100 |
| Water | 143 |
| $NH_4OH$ (28% solution) | 2 |

These ingredients were mixed in order to form a thixotropic 64 percent total solids pigment slurry in water. This slurry was passed through a high-speed Morehouse mill four times for complete dispersion, and then mixed with the respective latices as follows:

| Primers | P-A | P-B | P-C |
|---|---|---|---|
| $I_r$ of latices | 0.24 | 0.51 | 1.53 |
| Latex (37.5% $T_s$; pH=9.0), gms | 400 | 400 | 400 |
| Predispersed iron oxide paste (64% $T_s$), gms | 230 | 230 | 230 |
| Ethylene glycol, gms | 7.5 | 7.5 | 7.5 |
| 2-Ethylhexanol, gms | 7.5 | 7.5 | 7.5 |
| Ketosol "75', gms | 37.5 | 37.5 | 37.5 |
| 3,4-Epoxy-6-methylcyclohexylmethyl 3,4-epoxy-6-methylcyclohexanecarboxylate, gms | 16.8 | 16.8 | 16.8 |

The ingredients were mixed in order with stirring and the resulting primers were each applied to bonderized steel exposure panels, and baked and wet-sanded in the manner of the previous examples.

A white latex metal paint was prepared from each of the three latices as follows:

| Topcoats | TC-A | TC-B | TC-C |
|---|---|---|---|
| Latex (32.5% $T_s$; pH=8.5), gms | 462 | 462 | 462 |
| $TiO_2$ pigment predispersion, gms | 96 | 96 | 96 |
| Ethylene glycol, gms | 7.5 | 7.5 | 7.5 |
| 2-Ethylhexanol, gms | 15 | 15 | 15 |
| Ketosol "75", gms | 30 | 30 | 30 |
| 3,4-Epoxy-6-methylcyclohexylmethyl 3,4-epoxy-6-methylcyclohexanecarboxylate, gms | 16.8 | 16.8 | 16.8 |

These ingredients were mixed in order with constant stirring and the completed paints were applied in two double coats over the wet-sanded primers and baked by the usual schedule. There was a noticeable difference in the final applied cured appearance of the three different latex coatings. Latex coating TC-A involving the resin of lowest molecular weight ($I_r=0.24$) was smooth and highly glossy, while latex TC-B of intermediate resin molecular weight ($I_r=0.51$) possessed a gloss to semi-gloss appearance and required a light buffing for the full depth of gloss. Panels coated with latex TC-C containing the resin of highest molecular weight ($I_r=1.53$) was smooth and continuous but displayed no gloss at all. Considerable buffing with an abrasive compound did not produce the desirable appearance of either latex TC-A or latex TC-B. Test data for the three coatings are summarized in appended Table 4.

EXAMPLE 34

| | Grams |
|---|---|
| Styrene | 140 |
| 2-ethylhexyl acrylate | 136 |
| Acrylamide (50% sol. in water) | 200 |
| Methacrylic acid | 25 |
| t-Butyl mercaptan | 2 |
| Duponol Me | 2.5 |
| Tergitol NPX | 7.5 |
| $K_2S_2O_8$ | 2 |
| Water | 700 |
| $NH_4OH$ (.3% solution) | 250 |

$T_s=30.2\%$; $I_r=0.31$; $T_G=64°$ C.; pH=7.6.

A latex composition was produced according to the general procedure of Example 1 and application and baking of the latex composition on metal produced a continuous, glossy coating.

EXAMPLE 35

| | Grams |
|---|---|
| Methyl methacrylate | 260 |
| 2-ethylhexyl acrylate | 100 |
| Acrylamide (50% sol. in water) | 40 |
| Methacrylic acid | 20 |
| t-Butyl mercaptan | 2 |
| Duponol Me | 2.5 |
| Tergitol NPX | 7.5 |
| $K_2S_2O_8$ | 3 |
| Water | 700 |
| $NH_4OH$ (2.8% solution) | 150 |

$T_s=32.6\%$; $I_r=0.28$; $T_G=81°$ C.; pH=8.

A coating composition was prepared from this latex with the same paint formulation as Example 2, and sprayed on metal panels. Continuous, glossy coatings were obtained.

EXAMPLE 36

| | Grams |
|---|---|
| Vinyl fluoride | 200 |
| Ethyl acrylate | 200 |
| N,N-diethylacrylamide | 75 |
| Acrylic acid | 25 |
| t-Butyl mercaptan | 2 |
| Duponol Me | 2.5 |
| Tergitol NPX | 7.5 |
| $K_2S_2O_8$ | 3 |
| Water | 700 |
| $NH_4OH$ (1.5% solution) | 205 |

A latex produced from the above formulation according to the general procedure of Example 1 and applied to a metal substrate, forms a continuous, smooth, glossy coating.

EXAMPLE 37

| | Grams |
|---|---|
| Styrene | 200 |
| 2-ethylhexyl acrylate | 160 |
| Acrylamide (50% sol. in water) | 40 |
| Methacrylic acid | 20 |
| t-Butyl mercaptan | 2 |
| Duponol Me | 2.5 |
| Tergitol NPX | 7.5 |
| $K_2S_2O_8$ | 3 |
| Water | 700 |
| $NH_4OH$ (1.5% solution) | 205 |

$T_s=30.7\%$; $I_r=0.2$; $T_G=54°$ C.; pH=8.5.

A latex was prepared and a coating composition formulated according to the methods of the previous examples. Application and baking of the coating composition on metal panels produced continuous, glossy finishes.

EXAMPLE 38

| | Grams |
|---|---|
| Styrene | 240 |
| 2-ethylhexyl acrylate | 240 |
| Acrylontrile | 90 |
| Acrylic acid | 30 |
| t-Butyl mercaptan | 1 |
| Duponol Me | 3.75 |
| Tergitol NPX | 11.25 |
| $K_2S_2O_8$ | 3 |
| Water | 700 |
| $NH_4OH$ (28% solution) | — |

$T_s=37.6\%$; $I_r=0.51$; $T_G=46°$ C.; pH=8.

A pigment paste for metal primer paint was formulated as follows:

| | Grams |
|---|---|
| Water (deionized) | 400 |
| $NH_4OH$ (28% solution) | 5 |
| Tamol 731 (25% active) | 24 |
| Triton CF-10 | 6 |
| Pine oil | 2 |
| Barytes (Sparmite) | 279 |
| Wollastonite P-1 | 246 |
| Brown iron oxide (VVF-B2093F) | 379 |
| Talc (Nytal 300) | 75 |

The components were mixed in order and passed through a high-speed Morehouse mill three times to affect complete dispersion. A fluid pigment dispersion resulted containing 72 percent total solids.

1494 grams of the above paste were stirred into 1060 grams of latex producing a 2.5/1 pigment:resin ratio by weight of a 40 percent pigment volume concentration.

A metal primer paint was completed by stirring a solution of the following into the pigment-latex mixture:

| | Grams |
|---|---|
| Ethylene glycol | 20 |
| 2-ethylhexanol | 40 |
| Ketosol "75" | 100 |
| 3,4-epoxy-6-methylcyclohexylmethyl 3,4-epoxy-6-methylcyclohexanecarboxylate | 45 |

The smooth, fluid, primer paint was then applied to bonderized steel panels in two double coats, air-dried thirty minutes, baked fifteen minutes at a temperature of 80° C. and then thirty minutes at 149° C. A hard, easily sandable metal primer resulted with a dry coating thickness of 1.5–1.6 mils.

This primer, having a flexible nature, was used as a base for the white metal paints of Examples 39 and 40.

EXAMPLE 39

| | Grams |
|---|---|
| Methyl methacrylate | 300 |
| 2-ethylhexyl methacrylate | 76 |
| Methacrylic acid | 24 |
| Duponol Me | 2.5 |
| Tergitol NPX | 7.5 |
| $K_2S_2O_8$ | 2 |
| Water | 500 |
| $NH_4OH$ (14% solution) | 20 |

$T_s=43.5\%$; $I_r=0.48$; $T_G=93°$ C.; pH=8.1.

A white metal finishing paint, using the previously described $TiO_2$ predispersion was prepared as follows:

| | Grams |
|---|---|
| Latex ($T_s=44.0\%$; pH=8.1) | 341 |
| Water | 87 |
| $TiO_2$ pigment dispersion (78% $T_s$) | 96 |
| Ethylene glycol | 10 |
| 2-ethylhexanol | 15 |
| Ketosol "75" | 40 |
| 3,4-epoxy-6-methylcyclohexylmethyl 3,4-epoxy-6-methylcyclohexanecarboxylate (87% pure) | 18.5 |

The ingredients were mixed in order with stirring and the resultant paint formulation was sprayed on bonderized steel panels which were prime-coated with the latex metal primer of Example 38. The white finish was applied over the wet-sanded primer in two double coats, air-dried fifteen minutes, baked fifteen minutes at a temperature of 80° C. and then thirty minutes at 149° C. A smooth, semi-gloss, continuous finish resulted which buffed to a beautiful gloss. Test data are summarized in appended Table 5.

EXAMPLE 40

| | Grams |
|---|---|
| Methyl methacrylate | 300 |
| Hexyl methacrylate | 76 |
| Methacrylic acid | 24 |
| t-Butyl mercaptan | 1 |
| Duponol Me | 2.5 |
| Tergitol NPX | 7.5 |
| $K_2S_2O_8$ | 2 |
| Water | 500 |
| $NH_4OH$ (14% solution) | 30 |

$T_s=43.5\%$; $I_r=0.65$; $T_G=96°$ C.; pH=8.1.

A white finish was prepared from this latex in the same manner as in Example 39. The paint was sprayed on wet-sanded latex metal primer (from Example 38) and baked in the conventional manner. A semi-gloss finish resulted which buffed to a beautiful gloss. Test data are summarized in appended Table 5.

EXAMPLE 41

| | Grams |
|---|---|
| Methyl methacrylate | 300 |
| n-Butyl methacrylate | 76 |
| Methacrylic acid | 24 |
| t-Butyl mercaptan | 1 |
| Duponol Me | 2.5 |
| Tergitol NPX | 7.5 |
| $K_2S_2O_8$ | 2 |
| Water | 500 |
| $NH_4OH$ (24% solution) | 25 |

$T_s=44.0\%$; $I_r=0.65$; $T_G=98°$ C.; pH=8.5.

A white paint was prepared from this latex and applied to latex primed panels (from Example 1) in the same manner as in Example 39. The same curing cycle was followed, and a smooth, continuous, semi-gloss finish resulted which buffed to an excellent gloss. Test data are summarized in appended Table 5.

EXAMPLE 42

| | Grams |
|---|---|
| Styrene | 100 |
| 2-ethylhexyl acrylate | 180 |
| Acrylonitrile | 100 |
| Acrylic acid | 20 |
| t-Butyl mercaptan | 1 |
| Duponol Me | 2.5 |
| Tergitol NPX | 7.5 |
| $K_2S_2O_8$ | 2 |
| Water | 500 |
| $NH_4OH$ (20% solution) | 20 |

$T_s=34.5\%$; $I_r=0.4$; $T_G=43°$ C.; pH=8.1.

This latex was evaluated principally as a binder for latex metal primer. A primer-pigment paste was prepared for the latex as follows:

| | Grams |
|---|---|
| Water (deionized) | 1600 |
| $NH_4OH$ (28% solution) | 20 |
| Duponol Me | 12 |
| Tergitol NPX | 36 |
| Pine oil | 8 |
| Barytes No. 1 | 1800 |
| Brown iron oxide | 1800 |
| Talc (Nytal 300) | 600 |

These ingredients were mixed in order in a one-gallon stainless steel vessel, each portion being thoroughly wetted before the next was added. It was then passed through a high-speed Morehouse mill four times to effect complete dispersion. A medium viscosity, thixotropic slurry resulted containing 72 percent solids content.

522 grams of this paste was then added to 487 grams of latex with constant stirring to give 150 grams of resin and a 2.5/1 pigment:resin ratio by weight, or 40 percent pigment volume concentration.

| | Grams |
|---|---|
| Latex | 487 |
| Pigment paste (72% $T_s$) | 522 |
| Ethylene glycol | 10 |
| 2-ethylhexanol | 15 |
| Ketosol "75" | 30 |
| 3,4-epoxy-6-methylcyclohexylmethyl 3,4-epoxy-6-methylcyclohexanecarboxylate (87% pure) | 17.5 |

These ingredients were mixed in order with constant stirring and allowed to age overnight. The primer paint was then sprayed on bonderized steel panels in two double coats and cured in the conventional manner to form a protective coating on the steel panels. Test data are summarized in appended Table 5.

EXAMPLE 43

| | Grams |
|---|---|
| Styrene | 120 |
| Butyl acrylate | 200 |
| Acrylonitrile | 60 |
| Acrylic acid | 20 |
| t-Butyl mercaptan | 1 |
| Duponol Me | 2.5 |
| Tergitol NPX | 7.5 |
| $K_2S_2O_8$ | 2 |
| Water | 500 |
| $NH_4OH$ (20% solution) | 20 |

$T_s=34.7\%$; $I_r=0.4$; $T_G=46°$ C.; pH=7.8.

The latex was prepared according to the procedure of Example 1. A latex primer paint was completed from this latex as follows:

| | Grams |
|---|---|
| Latex | 328 |
| $NH_4OH$ (28% solution) | 1 |
| Iron oxide pigment paste (from Example 42) | 434 |
| Ethylene glycol | 10 |
| 2-ethylhexanol | 12.5 |

| | Grams |
|---|---|
| Ketosol "75" | 25 |
| 3,4 - epoxy-6-methylcyclohexylmethyl 3,4-epoxy-6-methylcyclohexanecarboxylate (87%) pure | 17.5 |

These ingredients were mixed in order with constant stirring and passed through a high-speed Morehouse mill twice for complete dispersion. The finished primer paint contained a 2.5/1 pigment:resin ratio by weight, or 40 percent pigment volume concentration. The primer paint was applied to bonderized steel panels in two double coats and cured in the conventional manner.

A pigment paste was made of white titanium dioxide pigment ($TiO_2$, R–510) in water as follows:

| | Grams |
|---|---|
| Water | 193 |
| Tamol 731 (25% $T_s$) | 32 |
| $TiO_2$, R–510 | 800 |

These materials were stirred together to form a highly thixotropic (high viscosity at low shear rate) slurry of pigment in water. The slurry was ground in a pebble mill for twenty-four hours to achieve complete dispersion.

A white metal paint was made from the latex as follows:

| | Grams |
|---|---|
| Latex (38% $T_s$) | 395 |
| $TiO_2$ pigment predispersion (78% $T_s$) | 96 |
| Water | 67 |
| $NH_4OH$ | 2 |
| Ethylene glycol | 10 |
| 2-ethylhexanol | 15 |
| Ketosol "75" | 30 |
| 3,4 - epoxy-6-methylcyclohexylmethyl 3,4-epoxy-6-methylcyclohexanecarboxylate (87% pure) | 18 |

These ingredients were mixed in order with constant stirring and the paint was applied and cured in a conventional manner over the above wet-sanded primer coating. A smooth, continuous, glossy finish resulted. Test data are summarized in appended Table 5.

EXAMPLE 44

| | Grams |
|---|---|
| Vinyl chloride | 27 |
| Ethyl acrylate | 24 |
| Acrylonitrile | 6 |
| Acrylic acid | 3 |
| t-Butyl mercaptan | 0.24 |
| Duponol Me | 0.375 |
| Tergitol NPX | 1.025 |
| $K_2S_2O_8$ | 0.3 |
| $NaHSO_3$ (sodium bisulfite) | 0.15 |
| Water | 140 |
| $NH_4OH$ (10% solution) | 28 |

$T_s=27\%$; $I_r=0.29$; $T_G=51°$ C.; pH=7.1.

The latex was made by charging all the ingredients to a pressure bottle, flushing with nitrogen, and sealing and placing the bottle in a constant temperature bath at 40° C. for two hours. The conventional means of monomer addition was not followed in this case since vinyl chloride is volatile at room temperature. A paint was prepared by conventional formulation and applied to a bonderized steel panel and baked ten minutes at a temperature of 149° C. A coating with excellent gloss and hardness was obtained.

EXAMPLE 45

| | Grams |
|---|---|
| Vinyl fluoride | 180 |
| Ethyl acrylate | 160 |
| Acrylonitrile | 40 |
| Acrylic acid | 20 |
| t-Butyl mercaptan | 1 |
| Duponol Me | 2.5 |
| Tergitol NPX | 7.5 |
| $K_2S_2O_8$ | 2 |
| Water | 500 |
| $NH_4OH$ (14% solution) | 30 |

As in the preceding example, this latex is prepared in a pressure bottle because of the volatility of the vinyl fluoride. A paint prepared by conventional formulation and applied and baked on bonderized steel panels yields continuous coatings of excellent gloss and hardness.

EXAMPLE 46

| | Grams |
|---|---|
| Vinylidene chloride | 72 |
| Ethyl acrylate | 64 |
| Acrylonitrile | 16 |
| Acrylic acid | 8 |
| t-Butyl mercaptan | 0.64 |
| Duponol Me | 1 |
| Tergitol NPX | 3 |
| $K_2S_2O_8$ | 0.8 |
| $NaHSO_3$ | 0.4 |
| Water | 240 |
| $NH_4OH$ (10% solution) | 40 |

$T_s=35.1\%$; $I_r=0.53$; $T_G=48°$ C.; pH=7.5.

The latex was prepared according to the procedure of Example 1. A white latex metal paint was formulated from this latex as follows:

| | Grams |
|---|---|
| Latex | 150 |
| $TiO_2$ pigment paste (78% $T_s$) | 31 |
| Ethylene glycol | 5 |
| 2-ethylhexanol | 5 |
| Ketosol "75" | 10 |
| 3,4-epoxy - 6 - methylcyclohexylmethyl 3,4-epoxy-6-methylcyclohexanecarboxylate (87% pure) | 6 |
| Water | 10 |

These ingredients were added in order with constant stirring. The paint was applied directly to bonderized steel panels in two double coats with no previous primer treatment. A smooth, high gloss finish resulted after air-drying.

EXAMPLE 47

| | Grams |
|---|---|
| Vinylidene fluoride | 180 |
| Ethyl acrylate | 160 |
| Acrylonitrile | 40 |
| Acrylic acid | 20 |
| t-Butyl mercaptan | 1 |
| Duponol Me | 2.5 |
| Tergitol NPX | 7.5 |
| $K_2S_2O_8$ | 2 |
| Water | 500 |
| $NH_4OH$ (14% solution) | 30 |

The latex is prepared in the same manner as the preceding example. Smooth, continuous, glossy films are produced when the latex is applied to bonderized steel panels and baked in the conventional manner.

EXAMPLE 48

| | Grams |
|---|---|
| Vinyl acetate | 320 |
| 2-ethylhexyl acrylate | 68 |
| Monoisopropyl maleate | 12 |
| Duponol Me | 4 |
| Tergitol NPX | 12 |
| $K_2S_2O_8$ | 2 |
| Water | 342 |
| $NH_4OH$ (4% solution) | 100 |

$T_s=47\%$; $I_r=0.63$; pH=6.5.

This latex was polymerized and neutralized in the manner of the previous examples. The latex was smooth and creamy. Application of the latex composition to substrates produced smooth, glossy coatings typical of the compositions of this invention.

EXAMPLE 49

| | Grams |
|---|---|
| Methyl methacrylate | 220 |
| Vinyl acetate | 92 |
| Acrylamide | 60 |
| Acrylic acid | 28 |
| t-Butyl mercaptan | 1 |
| Duponol Me | 4 |

| | Grams |
|---|---|
| Tergitol NPX | 12 |
| $K_2S_2O_8$ | 2.5 |
| Water | 580 |
| $NH_4OH$ (5% solution) | 195.5 |

$T_s=35\%$; pH=8.5.

The latex was mechanically and chemically stable, smooth, creamy and seed-free.

EXAMPLE 50

| | Grams |
|---|---|
| Methyl methacrylate | 340 |
| Ethyl acrylate | 40 |
| Acrylic acid | 20 |
| Duponol Me | 2.5 |
| Tergitol NPX | 7.5 |
| $K_2S_2O_8$ | 2 |
| Water | 500 |
| $NH_4OH$ (14% solution) | 34 |

$T_s=43.8\%$; $I_r=0.74$; $T_G=111°$ C.; pH=8.5.

The latex was polymerized in the manner of Example 1. Following the thirty-minute post-heating period, the latex was vacuum stripped at 75° C. for fifteen minutes at a pressure of 100 millimeters of mercury to remove an excess monomer. After neutralization the latex was formulated into a white metal paint as follows:

| | Grams |
|---|---|
| Latex | 349 |
| Pigment paste $TiO_2$ (78% $T_s$) | 96 |
| Water | 200 |
| $NH_4OH$ | 2 |
| 2-ethylhexanol | 15 |
| Ketosol "75" | 37.5 |
| 3,4-epoxy-6-methylcyclohexylmethyl 3,4-epoxy-6-methylcyclohexanecarboxylate | 18.5 |

These components were mixed together in order and allowed to age overnight. The paint was sprayed on latex primed panels in the conventional two double coat applications. The coatings were air-dried for fifteen minutes at a temperature of 80° C. and baked for thirty minutes at 149° C. After a light buffing a beautiful gloss was obtained. Test data are summarized in appended Table 5.

EXAMPLE 51

| | Grams |
|---|---|
| Styrene | 120 |
| 2-ethylhexyl acrylate | 180 |
| Methacrylonitrile | 80 |
| Acrylic acid | 20 |
| t-Butyl mercaptan | 1 |
| Duponol Me | 2.5 |
| Tergitol NPX | 7.5 |
| $K_2S_2O_8$ | 2 |
| Water | 500 |
| $NH_4OH$ (14% solution) | 34 |

$T_s=39.5\%$; pH=7.0.

A latex coating was cast on a glass surface and baked for fifteen minutes at a temperature of 149° C. A continuous, clear film with superior heat stability was produced.

EXAMPLE 52

| | Grams |
|---|---|
| Styrene | 225 |
| Ethyl acrylate | 200 |
| Methacrylonitrile | 50 |
| Acrylic acid | 25 |
| t-Dodecyl mercaptan | 2.5 |
| Duponol Me | 3.75 |
| Tergitol NPX | 11.25 |
| $K_2S_2O_8$ | 2.5 |
| Water (deionized) | 580 |
| $NH_4OH$ (2% solution) | 372 |

$T_s=31.1\%$; $I_r=0.40$; pH=7.3.

A white latex paint was prepared as follows:

| | Grams |
|---|---|
| Latex | 600 |
| $TiO_2$ pigment dispersion (78% $T_s$) | 60 |
| 2-ethylhexanol | 18.5 |
| Ketosol "75" | 37 |
| 3,4-epoxy-6-methylcyclohexyl-methyl 3,4-epoxy-6-methylcyclohexanecarboxylate (87% pure) | 28 |

The above ingredients were mixed together in order with constant stirring. The paint was applied to unprimed bonderized steel panels in two double coats. After curing in the conventional manner, a glossy finish was obtained which buffed easily to an exceptionally high gloss.

EXAMPLE 53

| | Grams |
|---|---|
| Styrene | 225 |
| Ethyl acrylate | 20 |
| Acrylonitrile | 50 |
| Acrylic acid | 25 |
| t-Butyl mercaptan | 1.75 |
| Duponol Me | 3.15 |
| Tergitol NPX | 9.35 |
| $K_2S_2O_8$ | 2.5 |
| Water | 272.5 |
| $NH_4OH$ (2.5% solution) | 310 |

$T_s=31.6\%$; $I_r=0.37$; $T_G=57°$ C.; pH=7.4.

This latex was polymerized in the conventional manner and vacuum stripped of excess monomer following the thirty-minute post-heat period. The removal of excess monomer permits a spraying of the latex paint without buildup on the tip of the spray gun or cratering in the final finish. A meter primer was prepared from this latex example as follows:

| | Grams |
|---|---|
| Latex | 395.5 |
| Iron oxide pigment paste | 434 |
| $NH_4OH$ (28% solution) | 4 |
| 2-ethylhexanol | 12.5 |
| Ketosol "75" | 12.5 |
| Santicizer 160 | 12.5 |
| 3,4-epoxy-6-methylcyclohexyl-methyl 3,4-epoxy-6-methylcyclohexanecarboxylate (87% pure) | 15 |

The ingredients were added in order with constant stirring. The white paint was applied to the wet-sanded primer above in a conventional manner, air-dried and cured with the usual baking schedule. A glossy, smooth, hard, tough latex metal finish resulted. Test data are summarized in appended Table 5.

EXAMPLE 54

This example illustrates the less desirable coating compositions that are obtained when interpolymers are employed which do not have a reduced viscosity in the range between about 0.2 and 0.8 and a second order transition temperature between about 45° C. and 125° C.

A latex coating composition was prepared in the following manner. A reaction vessel was charged with 75 parts of water and 0.2 part of Tergitol NPX. The temperature inside the vessel was raised to 80° C. and the following catalyst premix was slowly added during the entire polymerization period (80 minutes):

| | Parts |
|---|---|
| Water | 25 |
| Duponol Me (30% solution in isopropanol) | 1 |
| Potassium persulfate | 0.5 |

While the catalyst premix was being added, there was also added during the first thirty minutes a monomer premix "A" consisting of:

| | Parts |
|---|---|
| Acrylonitrile | 6 |
| Styrene | 14 |

When the addition of monomer premix "A" was completed, a monomer premix "B" was added over a period of fifty minutes which consisted of:

|   | Parts |
|---|---|
| Styrene | 38 |
| 2-ethylhexyl acrylate | 40 |
| Methacrylic acid | 2 |

When the reaction temperature started to decrease, the latex was cooled to room temperature and the pH of the mixture was adjusted to 8.5 with a 28 percent solution of ammonium hydroxide.

A paint composition was prepared from this latex using the procedure of Example 1. Ethylene glycol, 2-ethylhexanol, acetophenol, methyl phenyl carbinol and 3,4-epoxy-6-methylcyclohexylmethyl 3,4-epoxy-6-methylcyclohexanecarboxylate were added in a total amount which was 35 percent by weight based on the weight of the latex interpolymer. Titanium dioxide pigment was employed at a 3 to 1 interpolymer to pigment weight ratio. The paint formulation was applied to a steel panel by spraying and was baked for thirty minutes at a temperature of 149° C. The coating produced was glossy but was too soft for baked metal finishes. Because of poor chemical stability, the latex paint formulation gelled within forty-eight hours after preparation.

A film was cast at room temperature from the latex composition which was tacky and contained tiny flocculates.

EXAMPLE 55

This example illustrates the preparation and application of a latex composition containing powdered metal.

Aluminum powder was surface-treated in the following manner in order to reduce its reactivity with water:

|   | Grams |
|---|---|
| Water (deionized) | 230 |
| $(NH_4)_2HPO_4$ | 5.4 |
| Triton X-100 | 3 |
| Aluminum pigment MD-3100 (non-leafing) | 120 |

These ingredients were stirred together and allowed to stand for twenty-four hours to permit the ammonium biphosphate to deposit on the powdered metal surface as a protective coating. An aluminum paint was then prepared in the following manner:

| | |
|---|---|
| Latex (same as in Example 1; 32.5% solids) | 678 grams (220 grams resin). |
| Aluminum pigment paste (33.5% aluminum) | 66 grams (10% aluminum based on resin wt.). |
| Ethylene glycol | 22 grams. |
| 2-ethylhexanol | Do. |
| Ketosol "75" | 44 grams. |
| 3,4-epoxy-6-methylcyclohexylmethyl 3,4-epoxy-6-methylcyclohexanecarboxylate | 41 grams. |

These ingredients were mixed in order with stirring and applied to latex metal primers and standard automotive primers by conventional spray technique as in the previous examples. The coatings were lightly buffed and finishes were produced which had outstanding gloss.

TABLE 1

| Commercial Paint Control Panel | C-1 | C-2 | C-3 | C-4 | C-5 |
|---|---|---|---|---|---|
| Humidity Box (1,000 hours) | 0 | 0 | 10 | 4 | 0 |
| Salt Spray Cabinet (500 hours) | 10 | 8 | 10 | 8 | 10 |
| Water Immersion (500 hours) | ---- | ---- | ---- | ---- | ---- |
| Gravelometer | 9 | 8 | 8 | 9 | 8 |
| Solvent Resistance (Gasoline) | 10 | 7 | 10 | 6 | 9 |
| Cycling Test | 10 | 10 | 10 | 10 | 4 |
| Control Panel: |   |   |   |   |   |
| Gloss (60°) | 95 | 88 | 99 | 97 | 96 |
| Gloss Retention | 10 | 10 | 10 | 10 | 10 |
| Adhesion | 7 | 6 | 7 | 8 | 8 |
| Impact Resistance | 7 | 7 | 8 | 6 | 6 |
| Mandrel Test | 9 | 6 | 4 | 3 | 3 |

TABLE 2

| Example Number | 1 | 2 | 3 | 4 | 5 | 6 | 7 |
|---|---|---|---|---|---|---|---|
| Humidity Box (1,000 hours) | 8 | 10 | 10 | 4 | 10 | 0 | 5 |
| Cycling Test | ---- | 10 | 10 | ---- | 10 | ---- | ---- |
| Control Panel: |   |   |   |   |   |   |   |
| Gloss (60°) | 98 | 99 | 96 | 98 | 96 | >100 | 99 |
| Gloss Retention | 10 | 10 | 10 | 10 | 10 | 10 | 10 |
| Adhesion | 9 | 10 | 10 | 10 | 8 | 10 | 10 |
| Impact Resistance | 4 | 4 | 6 | 6 | 9 | 6 | 6 |
| Mandrel Test | 3 | 3 | 3 | 3 | 10 | 3 | 3 |

TABLE 3

| Example Number | 8 | 9 | 10 | 11 | 12 | 13 | 24 |
|---|---|---|---|---|---|---|---|
| Humidity Box (1,000 hours) | 4 | ¹2 | ¹4 | ¹4 | 7 | ¹4 | 8 |
| Control Panel: |   |   |   |   |   |   |   |
| Gloss (60°) | >100 | >100 | >100 | >100 | >100 | >100 | 92 |
| Gloss Retention | 10 | 10 | 10 | 10 | 10 | 10 | 10 |
| Adhesion | 10 | 8 | 10 | 8 | 8 | 10 | 8 |
| Impact Resistance | 6 | 6 | 6 | 8 | 8 | 6 | 6 |
| Mandrel Test | 3 | 3 | 3 | 10 | 10 | 3 | 2 |

¹ 100 Hours.

TABLE 4

| Example Number | 25 | 28 | 29 | 30 | 31 | 32 | 33 |
|---|---|---|---|---|---|---|---|
| Humidity Box (1,000 hours) | 8 | ---- | ¹5 | 10 | 10 | 10 | 10, 10, 10 |
| Salt Spray Cabinet (500 hours) | ---- | 4 | 6 | 9 | 9 | 9 | 2, 3, 4 |
| Water Immersion (500 hours) | ---- | ---- | 7 | ²10 | 10 | 10 | 10, 9, 10 |
| Gravelometer | ---- | 8+ | 9 | 8 | 7 | 8 | 8, 8, 9 |
| Solvent Resistance: |   |   |   |   |   |   |   |
| Gasoline | ---- | 10 | 2 | 10 | ---- | 9 | 8, 7+, 10 |
| Grease | ---- | ---- | 10 | 10 | 10 | 10 | 10, 10, 10 |
| Soap (1% "Tide") | ---- | ---- | 4 | 7 | 7 | 7 | 5, 6, 6 |
| Alkali (3% NaOH) | ---- | ---- | 10 | 10 | 10 | 10 | 10, 10, 10 |
| Cycling Test | ---- | ---- | ---- | ---- | ---- | 10 | 10, 10, 10 |
| Control Panel: |   |   |   |   |   |   |   |
| Gloss (60°) | 96 | 91 | 96 | 97 | 98 | 96 | 99, 91, 76 |
| Gloss Retention | 10 | 10 | 10 | 10 | 10 | 10 | 10, 10, 10 |
| Adhesion | 8 | 10 | 9 | 10 | 10 | 10 | 10, 10, 10 |
| Impact Resistance | 7 | 4 | 6 | 6 | 6 | 6 | 4, 7, 7 |
| Mandrel Test | 10 | 4 | 3 | 3 | 2 | 0 | 2, 0, 0 |

¹ 500 Hours.
² 1,200 Hours.

TABLE 5

| Example Number | 39 | 40 | 41 | 42 | 43 | 50 | 53 |
|---|---|---|---|---|---|---|---|
| Humidity Box (1,000 hours) | ¹10 | ¹9 | ¹10 | 10 | 10 | 9 | 9 |
| Salt Spray Cabinet (500 hours) | 6 | 5 | 5 | 8 | 5 | 7 | 7 |
| Water Immersion (500 hours) | 10 | 10 | 10 | 10 | 10 | 9 | 10 |
| Gravelometer | 9 | 9 | 9 | 10 | 8+ | 10 | 10 |
| Solvent Resistance: |   |   |   |   |   |   |   |
| Gasoline | 10 | 10 | 10 | 5 | 4 | 9 | 5 |
| Grease | ---- | ---- | ---- | ---- | ---- | ---- | 10 |
| Soap (1% "Tide") | ---- | ---- | ---- | ---- | ---- | ---- | 6 |
| Alkali (3% NaOH) | ---- | ---- | ---- | ---- | ---- | ---- | 10 |
| Cycling Test | 10 | 10 | 10 | 10 | 10 | 8 | 10 |
| Control Panel: |   |   |   |   |   |   |   |
| Gloss (60°) | 66 | 74 | 78 | ---- | 86 | 96 | 95 |
| Gloss Retention | 10 | 10 | 10 | ---- | 10 | 10 | 10 |
| Adhesion | 10 | 10 | 10 | ---- | 8 | 10 | 10 |
| Impact Resistance | 6 | 4 | 4 | ---- | 10 | 4 | 6 |
| Mandrel Test | 3 | 3 | 3 | ---- | 10 | 0 | 4 |

¹ 250 Hours.

What is claimed is:

1. An interpolymer of monomers comprising (1) about 25–90 parts by weight selected from the group consisting of monovinyl aromatic hydrocarbon, methyl methacrylate, vinyl acetate, vinyl fluoride, vinyl chloride, vinylidene fluoride and vinylidene chloride, (2) 0–50 parts by weight of $\alpha,\beta$-olefinically unsaturated nitrile, (3) about 10–60 parts by weight selected from the group consisting of alkyl acrylate having between four and about fifteen carbon atoms, alkyl methacrylate having between five and about fifteen carbon atoms, cyanoalkyl acrylate, acrylamide and N,N-dialkylacrylamide, and (4) about 1–10 parts by weight of $\alpha,\beta$-olefinically unsaturated carboxylic acid containing up to about ten carbon atoms, said interpolymer having a reduced viscosity of between about 0.2 and 0.8 and a second order transition temperature of between about 45° C. and 125° C.

2. An interpolymer of monomers comprising (1) about 25–90 parts by weight selected from the group consisting of monovinyl aromatic hydrocarbon, methyl methacrylate, vinyl acetate, vinyl fluoride, vinyl chloride, vinylidene fluoride and vinylidene chloride, (2) 5–30 parts by weight of α,β-olefinically unsaturated nitrile, (3) about 10–60 parts by weight selected from the group consisting of alkyl acrylate having between four and about fifteen carbon atoms, alkyl methacrylate having between five and about fifteen carbon atoms, cyanoalkyl acrylate, acrylamide, and N,N-dialkylacrylamide, and (4) about 2–7 parts by weight of α,β-olefinically unsaturated carboxylic acid containing up to about ten carbon atoms, said interpolymer having a reduced viscosity of between about 0.2 and 0.8 and a second order transition temperature of between about 45° C. and 125° C.

3. An interpolymer of monomers comprising (1) about 25–90 parts by weight of monovinyl aromatic hydrocarbon, (2) 0–50 parts by weight of α,β-olefinically unsaturated nitrile, (3) about 10–60 parts by weight selected from the group consisting of alkyl acrylate having between four and about fifteen carbon atoms, alkyl methacrylate having between five and about fifteen carbon atoms, cyanoalkyl acrylate, acrylamide and N,N-dialkylacrylamide, and (4) about 1–10 parts by weight of α,β-olefinically unsaturated carboxylic acid containing up to about ten carbon atoms, said interpolymer having a reduced viscosity of between about 0.2 and 0.8 and a second order transition temperature of between about 45° C. and 125° C.

4. An interpolymer of monomers comprising (1) about 25–90 parts by weight of methyl methacrylate, (2) 0–50 parts by weight of α,β-olefinically unsaturated nitrile, (3) about 10–60 parts by weight selected from the group consisting of alkyl acrylate having between four and about fifteen carbon atoms, alkyl methacrylate having between five and about fifteen carbon atoms, cyanoalkyl acrylate, acrylamide and N,N-dialkylacrylamide, and (4) about 1–10 parts by weight of α,β-olefinically unsaturated carboxylic acid containing up to about ten carbon atoms, said interpolymer having a reduced viscosity of between about 0.2 and 0.8 and a second order transition temperature of between about 45° C. and 125° C.

5. An interpolymer of monomers comprising (1) about 25–90 parts by weight of vinyl acetate, (2) 0–50 parts by weight of α,β-olefinically unsaturated nitrile, (3) about 10–60 parts by weight selected from the group consisting of alkyl acrylate having between four and about fifteen carbon atoms, alkyl methacrylate having between five and about fifteen carbon atoms, cyanoalkyl acrylate, acrylamide, N,N-dialkylacrylamide, and (4) about 1–10 parts by weight of α,β-olefinically unsaturated carboxylic acid containing up to about ten carbon atoms, said interpolymer having a reduced viscosity of between about 0.2 and 0.8 and a second order transition temperature of between about 45° C. and 125° C.

6. An interpolymer of monomers comprising (1) about 25–90 parts by weight of vinyl fluoride, (2) 0–50 parts by weight of α,β-olefinically unsaturated nitrile, (3) about 10–60 parts by weight selected from the group consisting of alkyl acrylate having between four and about fifteen carbon atoms, alkyl methacrylate having between five and about fifteen carbon atoms, cyanoalkyl acrylate, acrylamide and N,N-dialkylacrylamide, and (4) about 1–10 parts by weight of α,β-olefinically unsaturated carboxylic acid containing up to about ten carbon atoms, said interpolymer having a reduced viscosity of between about 0.2 and 0.8 and a second order transition temperature of between about 45° C. and 125° C.

7. An interpolymer of monomers comprising (1) about 25–90 parts by weight of vinyl chloride, (2) 0–50 parts by weight of α,β-olefinically unsaturated nitrile, (3) about 10–60 parts by weight selected from the group consisting of alkyl acrylate having between four and about fifteen carbon atoms, alkyl methacrylate having between five and about fifteen carbon atoms, cyanoalkyl acrylate, acrylamide and N,N-dialkylacrylamide, and (4) about 1–10 parts by weight of α,β-olefinically unsaturated carboxylic acid containing up to about ten carbon atoms, said interpolymer having a reduced viscosity of between about 0.2 and 0.8 and a second order transition temperature of between about 45° C. and 125° C.

8. An interpolymer of monomers comprising (1) about 25–90 parts by weight of vinylidene fluoride, (2) 0–50 parts by weight of α,β-olefinically unsaturated nitrile, (3) about 10–60 parts by weight selected from the group consisting of alkyl acrylate having between four and about fifteen carbon atoms, alkyl methacrylate having between five and about fifteen carbon atoms, cyanoalkyl acrylate, acrylamide and N,N-dialkylacrylamide, and (4) about 1–10 parts by weight of α,β-olefinically unsaturated carboxylic acid containing up to about ten carbon atoms, said interpolymer having a reduced viscosity of between about 0.2 and 0.8 and a second order transition temperature of between about 45° C. and 125° C.

9. An interpolymer of monomers comprising (1) about 25–90 parts by weight of vinylidene chloride, (2) 0–50 parts by weight of α,β-olefinically unsaturated nitrile, (3) about 10–60 parts by weight selected from the group consisting of alkyl acrylate having between four and about fifteen carbon atoms, alkyl methacrylate having between five and about fifteen carbon atoms, cyanoalkyl acrylate, acrylamide and N,N-dialkylacrylamide, and (4) about 1–10 parts by weight of α,β-olefinically unsaturated carboxylic acid containing up to about ten carbon atoms, said interpolymer having a reduced viscosity of between about 0.2 and 0.8 and a second order transition temperature of between about 45° C. and 125° C.

10. A composition of matter comprising an interpolymer containing free carboxylic acid groups and having a reduced viscosity of between about 0.2 and 0.8 and a second order transitioin temperature of between about 45° C. and 125° C., said interpolymer comprising (1) a monomer selected from the group consisting of monovinyl aromatic hydrocarbon, methyl methacrylate, vinyl acetate, vinyl fluoride, vinyl chloride, vinylidene fluoride and vinylidene chloride, (2) an α,β-olefinically unsaturated nitrile, (3) a monomer selected from the group consisting of alkyl acrylate having between four and about fifteen carbon atoms, alkyl methacrylate having between five and about fifteen carbon atoms, cyanoalkyl acrylate, acrylamide and N,N-dialkylacrylamide, and (4) an α,β-olefinically unsaturated carboxylic acid containing up to about ten carbon atoms.

11. A curable composition comprising an interpolymer of monomers which comprises (1) about 25–90 parts by weight selected from the group consisting of monovinyl aromatic hydrocarbon, methyl methacrylate, vinyl acetate, vinyl fluoride, vinyl chloride, vinylidene fluoride and vinylidene chloride, (2) 0–50 parts by weight of α,β-olefinically unsaturated nitrile, (3) about 10–600 parts by weight selected from the group consisting of alkyl acrylate having between four and about fifteen carbon atoms, alkyl methacrylate having between five and about fifteen carbon atoms, cyanoalkyl acrylate, acrylamide and N,N-dialkylacrylamide, and (4) about 1–10 parts by weight of α,β-olefinically unsaturated carboxylic acid containing up to about ten carbon atoms, said interpolymer having a reduced viscosity of between about 0.2 and 0.8 and a second order transition temperature of between about 45° C. and 125° C., and a crosslinking quantity of an organic compound having crosslinking reactivity with the carboxylic acid groups of said interpolymer.

12. The curable composition of claim 11 wherein said reactive organic compound is selected from the group consisting of poly(1,2-epoxide), polyhydric alcohol, polyhydric phenol, and polyamine, said reactive organic compound being employed in an amount that provides from about 0.5 to about 2.0 reactive groups per carboxylic group contained in said curable composition.

13. The curable composition of claim 11 wherein said reactive compound is a polyepoxide containing at least two cyclohexene oxide groups.

14. An interpolymer of monomers comprising (1) about 25–60 parts by weight of styrene, (2) about 5–30 parts by weight of acrylonitrile, (3) about 10–60 parts by weight of 2-ethylhexyl acrylate, and (4) about 2–7 parts by weight of acrylic acid, said interpolymer having a reduced viscosity of between about 0.2 and 0.8 and a second order transition temperature of between about 45° C. and 125° C.

15. An interpolymer of monomers comprising (1) about 25–60 parts by weight of styrene, (2) about 5–30 parts by weight of acrylonitrile, (3) about 10–60 parts by weight of ethyl acrylate, and (4) about 2–7 parts by weight of acrylic acid, said interpolymer having a reduced viscosity of between about 0.2 and 0.8 and a second order transition temperature of between about 45° C. and 125° C.

16. An interpolymer of monomers comprising (1) about 25–60 parts by weight of styrene, (2) about 5–30 parts by weight of acrylonitrile, (3) about 10–60 parts by weight of ethyl acrylate, and (4) about 2–7 parts by weight of methacrylic acid, said interpolymer having a reduced viscosity of between about 0.2 and 0.8 and a second order transition temperature of between about 45° C. and 125° C.

17. An interpolymer of monomers comprising (1) about 25–60 parts by weight of vinyl chloride, (2) about 5–30 parts by weight of acrylonitrile, (3) about 10–60 parts by weight of ethyl acrylate, and (4) about 2–7 parts by weight of acrylic acid, said interpolymer having a reduced viscosity of between about 0.2 and 0.8 and a second order transition temperature of between about 45° C. and 125° C.

18. An interpolymer of monomers comprising (1) about 50–85 parts by weight of methyl methacrylate, (2) about 5–30 parts by weight of acrylonitrile, (3) about 10–60 parts by weight of ethyl acrylate, and (4) about 2–7 parts by weight of acrylic acid, said interpolymer having a reduced viscosity of between about 0.2 and 0.8 and a second order transition temperature of between about 45° C. and 125° C.

19. An interpolymer of monomers comprising (1) about 25–60 parts by weight of vinyl fluoride, (2) about 5–30 parts by weight of acrylonitrile, (3) about 10–60 parts by weight of ethyl acrylate, and (4) about 2–7 parts by weight of acrylic acid, said interpolymer having a reduced viscosity of between about 0.2 and 0.8 and a second order transition temperature of between about 45° C. and 125° C.

20. An interpolymer of monomers comprising (1) about 25–60 parts by weight of vinylidene fluoride, (2) about 5–30 parts by weight of acrylonitrile, (3) about 10–60 parts by weight of ethyl acrylate, and (4) about 2–7 parts by weight of acrylic acid, said interpolymer having a reduced viscosity of between about 0.2 and 0.8 and a second order transition temperature of between about 45° C. and 125° C.

21. A latex composition comprising dispersed particles of an interpolylmer comprising (1) about 25–90 parts by weight selected from the group consisting of monovinyl aromatic hydrocarbon, methyl methacryalte, vinyl acetate, vinyl fluoride, vinyl chloride, vinylidene fluoride and vinylidene chloride, (2) 0–50 parts by weight of α,β-olefinically unsaturated nitrile, (3) about 10–60 parts by weight selected from the group consisting of alkyl acrylate having between four and about fifteen carbon atoms, alkyl methacrylate having between five and about fifteen carbon atoms, cyanoalkyl acrylate, acrylamide, and N,N-dialkylacrylamide, and (4) about 1–10 parts by weight of α,β-olefinically unsaturated carboxylic acid containing up to about ten carbon atoms, said interpolymer having a reduced viscosity of between about 0.2 and 0.8 and a second order transition temperature of between about 45° C. and 125° C.

22. A latex composition comprising dispersed particles of an interpolymer comprising (1) about 25–90 parts by weight selected from the group consisting of monovinyl aromatic hydrocarbon, methyl methacrylate, vinyl acetate, vinyl fluoride, vinyl chloride, vinylidene fluoride and vinylidene chloride, (2) 5–30 parts by weight of α,β-olefinically unsaturated nitrile, (3) about 10–60 parts by weight selected from the group consisting of alkyl acrylate having between four and about fifteen carbon atoms, alkyl methacrylate having between five and about fifteen carbon atoms, cyanoalkyl acrylate, acrylamide and N,N-dialkylacrylamide, and (4) about 2–7 parts by weight of α,β-olefinically unsaturated carboxylic acid containing up to about ten carbon atoms, said interpolymer having a reduced viscosity of between about 0.2 and 0.8 and a second order transition temperature of between about 45° C. and 125° C.

23. A latex composition comprising dispersed particles of an interpolymer comprising (1) about 25–90 parts by weight selected from the group consisting of monovinyl aromatic hydrocarbon, methyl methacrylate, vinyl acetate, vinyl fluoride, vinyl chloride, vinylidene fluoride and vinylidene chloride, (2) 0–50 parts by weight of α,β-olefinically unsaturated nitrile, (3) about 10–60 parts by weight selected from the group consisting of alkyl acrylate having between four and about fifteen carbon atoms, alkyl methacrylate having between five and about fifteen carbon atoms, cyanoalkyl acrylate, acrylamide and N,N-dialkylacrylamide, and (4) about 1–10 parts by weight of α,β-olefinically unsaturated carboxylic acid containing up to about ten carbon atoms, said interpolymer having a reduced viscosity of between about 0.2 and 0.8 and a second order transition temperature of between about 45° C. and 125° C., said latex composition having a pH in the alkaline range.

24. A latex composition comprising dispersed particles of an interpolymer comprising (1) about 25–90 parts by weight selected from the group consisting of monovinyl aromatic hydrocarbon, methyl methacrylate, vinyl acetate, vinyl fluoride, vinyl chloride, vinylidene fluoride and vinylidene chloride, (2) 0–50 parts by weight of α,β-olefinically unsaturated nitrile, (3) about 10–60 parts by weight selected from the group consisting of alkyl acrylate having between four and about fifteen carbon atoms, alkyl methacrylate having between five and about fifteen carbon atoms, cyanoalkyl acrylate, acrylamide and N,N-dialkylacrylamide, and (4) about 1–10 parts by weight of α,β-olefinically unsaturated carboxylic acid containing up to about ten carbon atoms, said interpolymer having a reduced viscosity of between about 0.2 and 0.8 and a second order transition temperature of between about 45° C. and 125° C.; and between about 15 and 50 percent by weight of filming aid based on the weight of said interpolymer.

25. The latex composition of claim 24 wherein said latex composition has a pH in the alkaline range.

26. A latex composition comprising dispersed particles of an interpolymer comprising (1) about 25–90 parts by weight selected from the group consisting of monovinyl aromatic hydrocarbon, methyl methacrylate, vinyl acetate, vinyl fluoride, vinyl chloride, vinylidene fluoride and vinylidene chloride, (2) 0–50 parts by weight of α,β-olefinically unsaturated nitrile, (3) about 10–60 parts by weight selected from the group consisting of alkyl acrylate having between four and about fifteen carbon atoms, alkyl methacrylate having between five and about fifteen carbon atoms, cyanoalkyl acrylate, acrylamide and N,N-dialkylacrylamide, and (4) about 1–10 parts by weight of α,β-olefinically unsaturated carboxylic acid containing up to about ten carbon atoms, said interpolymer having a reduced viscosity of between about 0.2 and 0.8 and a second order transition temperature of between about 45° C. and 125° C.; between about 15 and 50 percent by weight of filming aid based on the weight of said interpolymer; and a cross-linking quantity of a reactive organic compound, said latex composition having a pH in the alkaline range.

27. The latex composition of claim 26 wherein said filming aid is a mixture comprising ethylene glycol, 2-ethylhexanol, methyl phenyl carbinol and acetophenone, and said pH is between about 7 and 10.

28. The latex composition of claim 27 wherein said reactive compound is a polyepoxide compound in a quantity sufficient to provide between about 0.5 and 2.0 1,2-epoxide groups for each free carboxylic acid group in said interpolymer.

29. The latex composition of claim 28 wherein said polyepoxide compound contains at least two cyclohexene oxide groups.

30. The latex composition of claim 29 wherein said polyepoxide compound is 3,4-epoxy-6-methylcyclohexylmethyl 3,4-epoxy-6-methylcyclohexanecarboxylate.

31. A process for preparing an interpolymer having a reduced viscosity of between about 0.2 and 0.8 and a second order transition temperature of between about 45° C. and 125° C., which comprises interpolymerizing under aqueous emulsion conditions a mixture of monomers comprising about 25–90 parts by weight selected from the group consisting of monovinyl acromatic hydrocarbon, methyl methacrylate, vinyl acetate, vinyl fluoride, vinyl chloride, vinylidene fluoride and vinylidene chloride, about 0–50 parts by weight of α,β-olefinically unsaturated nitrile, about 10–60 parts by weight selected from the group consisting of alkyl acrylate having between four and about fifteen carbon atoms, alkyl methacrylate having between five and about fifteen carbon atoms, cyanoalkyl acrylate, acrylamide and N,N-dialkylacrylamide, and about 1–10 parts by weight of α,β-olefinically unsaturated carboxylic acid containing up to about ten carbon atoms, in the presence of about 0.1 and 2.0 percent by weight of a telogen molecular weight modifier based on the total weight of monomers.

32. The process of claim 31 wherein said telogen molecular weight modifier is an alkyl mercaptan and said process is conducted in the presence of between about 0.25 and 2.0 percent by weight of an anionic emulsifier and between about 0.5 and 6.0 percent by weight of a nonionic emulsifier based on the total weight of monomers.

33. The process of claim 32 wherein about three parts of nonionic emulsifier are present for every part of anionic emulsifier.

34. A process for preparing a latex of an interpolymer having a reduced viscosity of between about 0.2 and 0.8 and a second order transition temperature of between about 45° C. and 125° C., which comprises interpolymerizing underaqueous emulsion conditions about 25–60 parts by weight of styrene, about 5–30 parts by weight of acrylonitrile, about 10–60 parts by weight of ethyl acrylate and about 2–5 parts by weight of acrylic acid, in the presence of about 0.1 to 2.0 percent by weight of sodium lauryl sulfate and about 0.5 to 6.0 percent by weight of nonyl phenol-ethylene oxide adduct product based on the total weight of monomers.

35. A process for preparing a coating composition which comprises treating the latex of claim 21 with about 5 to 50 percent by weight of filming aid based on the weight of interpolymer, a sufficient quantity of a polyepoxide compound containing at least two cyclohexene oxide groups to provide between about 0.5 and 2.0 cyclohexene oxide oxirane oxygen groups for each free carboxylic acid group contained in said interpolymer, and a sufficient quantity of an alkaline material to make said coating composition alkaline.

36. A coating composition capable of forming a hard, glossy, moisture and solvent resistant coating comprising the latex of claim 21; about 15 to 50 percent by weight of filming aid based on the weight of interpolymer in said latex, said filming aid containing about 5–10 parts by weight of 2-ethylhexanol, about 1–10 parts by weight of ethylene glycol, about 10–25 parts by weight of methyl phenyl carbinol and about 5–10 parts by weight of acetophenone; a quantity of 3,4-epoxy-6-methylcyclohexylmethyl 3,4-epoxy-6-methylcyclohexanecarboxylate providing between about 0.5 and 2.0 epoxide groups for each free carboxylic acid group in the interpolymer; and a quantity of ammonium hydroxide providing a pH of 7–10.

37. The latex composition of claim 25 wherein said latex composition contains powdered metal pigment.

38. The composition of claim 26 wherein said reactive organic compound is trimethylol phenol.

39. The composition of claim 26 wherein said pH in the alkaline range is provided by ammonium hydroxide.

References Cited in the file of this patent

UNITED STATES PATENTS

| | | |
|---|---|---|
| 2,604,457 | Segall et al. | July 22, 1952 |
| 2,604,464 | Segall et al. | July 22, 1952 |
| 2,726,230 | Carlson | Dec. 6, 1955 |
| 2,767,153 | Sutton | Oct. 16, 1956 |
| 2,790,735 | McLaughlin et al. | Apr. 30, 1957 |
| 2,795,564 | Conn | June 11, 1957 |
| 2,837,444 | Hahn | June 3, 1958 |
| 2,868,748 | Frazier | Jan. 13, 1959 |

OTHER REFERENCES

Schildknecht: "Polymer Processes," Interscience Publishers Inc., New York, New York, pages 136–152 and pages 636–640.

Payne: "Organic Coating Technology," volume I, John Wiley & Sons, New York, page 7.